United States Patent
Currier et al.

(10) Patent No.: US 6,816,023 B1
(45) Date of Patent: Nov. 9, 2004

(54) OSCILLATOR TRANSMISSION AND SWITCHING APPARATUS FOR A DIGITAL DATA PROCESSING SYSTEM

(75) Inventors: Guy Richard Currier, Rochester, MN (US); James Scott Harveland, Byron, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 10/460,592

(22) Filed: Jun. 12, 2003

(51) Int. Cl.[7] .................................................. H03B 1/00
(52) U.S. Cl. ............................... 331/74; 331/2; 331/46; 331/49
(58) Field of Search ............................... 331/46, 49, 2, 331/74; 327/144, 145, 147

(56) References Cited

U.S. PATENT DOCUMENTS 3,226,648 A * 12/1965 Davidson ..................... 331/49
5,483,185 A * 1/1996 Scriber et al. .............. 327/144
5,793,227 A * 8/1998 Goldrian ..................... 327/145

* cited by examiner

Primary Examiner—Michael B Shingleton
(74) Attorney, Agent, or Firm—Roy W. Truelson

(57) ABSTRACT

An oscillator transmission switching circuit switches between asynchronous oscillator signals with low latency. Preferably, a fast switching circuit triggers a transition from a first oscillator to a second oscillator by entering a bridge input immediately following an edge of the first oscillator, holding in the bridge input until the same edge of the second oscillator is detected, and switching to the second oscillator. Preferably, the bridge input is selectable to accommodate conditions in which the first oscillator signal is stuck at either a logic 0 or a logic 1. A change of oscillators may be triggered by a fault detection circuit or by an external signal.

33 Claims, 15 Drawing Sheets

|     | INPUTS | | | | | | OUTPUTS | | | |
| --- | --- | --- | --- | --- | --- | --- | --- | --- | --- | --- |
|     | Pri Fault | Pri Stk0 | Sec Rise | Pri Rise | S1 L2 | S0 L2 | S2D | S1D | S0D | NOTES |
| 1.  | 0 | X | X | X | 0 | 0 | 0 | 0 | 0 | PriOsc stable |
| 2.  | 1 | 0 | X | 0 | 0 | 0 | 0 | 0 | 0 | PriFault, wait for PriRise |
| 3.  | 1 | 0 | X | 1 | 0 | 0 | 0 | 1 | 0 | -- got PriOsc rise |
| 4.  | 1 | 0 | 0 | X | 1 | 0 | 0 | 1 | 0 | -- wait for SecRise |
| 5.  | 1 | 0 | 1 | X | 1 | 0 | 0 | 1 | 1 | -- got SecRise |
| 6.  | 1 | X | X | X | 1 | 1 | 0 | 1 | 1 | SecOsc stable |
| 7.  | 0 | X | X | X | 0 | 0 | 0 | 0 | 0 | PriOsc stable |
| 8.  | 1 | 1 | X | X | 0 | 0 | 0 | 1 | 0 | PriOsc stuck0 |
| 9.  | 1 | 1 | 0 | X | 1 | 0 | 1 | 1 | 0 | -- wait for SecRise |
| 10. | 1 | 1 | 1 | X | 1 | 0 | 1 | 1 | 1 | -- got SecRise |
| 11. | 1 | X | X | X | 1 | 1 | 0 | 1 | 1 | SecOsc stable |
| 12. | 1 | X | X | X | 1 | 1 | 0 | 1 | 1 | SecOsc stable |
| 13. | 0 | X | 0 | X | 1 | 1 | 0 | 1 | 1 | PriOscOK, wait for SecRise |
| 14. | 0 | X | 1 | X | 1 | 1 | 0 | 1 | 0 | -- got SecRise |
| 15. | 0 | X | X | 0 | 1 | 0 | 0 | 1 | 0 | -- wait for PriOsc rise |
| 16. | 0 | X | X | 1 | 1 | 0 | 0 | 0 | 0 | -- got PriOsc rise |
| 17. | 0 | X | X | X | 0 | 0 | 0 | 0 | 0 | PriOsc stable |

FIG.8

OSCILLATOR TRANSMISSION AND SWITCHING APPARATUS FOR A DIGITAL DATA PROCESSING SYSTEM

FIELD OF THE INVENTION

The present invention relates to digital data processing hardware, and in particular to the design of transmission circuits for transmitting clock signals to components of a digital data processing system.

BACKGROUND OF THE INVENTION

In the latter half of the twentieth century, there began a phenomenon known as the information revolution. While the information revolution is a historical development broader in scope than any one event or machine, no single device has come to represent the information revolution more than the digital electronic computer. The development of computer systems has surely been a revolution. Each year, computer systems grow faster, store more data, and provide more applications to their users.

A modern computer system typically comprises a central processing unit (CPU) and supporting hardware necessary to store, retrieve and transfer information, such as communications buses and memory. It also includes hardware necessary to communicate with the outside world, such as input/output controllers or storage controllers, and devices attached thereto such as keyboards, monitors, tape drives, disk drives, communication lines coupled to a network, etc. The CPU is the heart of the system. It executes the instructions which comprise a computer program and directs the operation of the other system components.

From the standpoint of the computer's hardware, most systems operate in fundamentally the same manner. Processors are capable of performing a limited set of very simple operations, such as arithmetic, logical comparisons, and movement of data from one location to another. But each operation is performed very quickly. Programs which direct a computer to perform massive numbers of these simple operations give the illusion that the computer is doing something sophisticated. What is perceived by the user as a new or improved capability of a computer system is made possible by performing essentially the same set of very simple operations, but doing it much faster. Therefore continuing improvements to computer systems require that these systems be made ever faster.

A digital data processing device is a sequential state machine, in which state changes are regulated by signals from constant frequency oscillators, generally known as "clocks". In fact, a large computer system may have many clocks. The overall speed of a computer system (also called the throughput) may be crudely measured as the number of operations performed per unit of time. Conceptually, the simplest of all possible improvements to system speed is to increase the clock speeds of the various components, and particularly the clock speed of the processor(s). E.g., if everything runs twice as fast but otherwise works in exactly the same manner, the system will perform a given task in half the time.

Clock speeds are limited by various design parameters, but in particular are often limited by the transmission length of clock lines. A clock signal which is distributed only within an integrated circuit chip can operated at a relatively high frequency. However, as the clock signal is distributed to physically more remote components, such as multiple chips on an electronic circuit card assembly, or multiple card assemblies attached to a common mother board, or multiple card assemblies or similar devices in separate packaging units, it is generally necessary to slow down the clock. Early computer processors, which were constructed from many discrete components, were susceptible to significant speed improvements by shrinking component size, reducing component number, and eventually, packaging the entire processor as an integrated circuit on a single chip. The reduced size made it possible to increase the clock speed of the processor.

A large computer system typically has multiple physical components, some of which may be physically located in different electronic circuit card assemblies or in different housings. Additionally, the internal design (and maximum clock frequency) of any single digital component will vary. If a common, universal clock frequency is used for an entire system, it must be slow enough to accommodate the slowest element of the system, making it necessary to slow down the faster components to match the common frequency. Furthermore, since it is desirable to support the attachment of component of multiple different types, it may be difficult to know the characteristics of all system elements in advance. For these reasons, the various components of a computer system are typically designed to operate on different respective internal clock frequencies, which are usually generated by the components themselves.

Separate asynchronous clocks in different components may be fine as long as each component performs its function oblivious to the others. However, where data is to be communicated from one component to another, at least some degree of synchronization is generally required for the communication. This means that at least one of the components will receive an externally generated clock signal for timing on a communications medium, such as a bus. Although much of the internal logic within the component might not use this external clock signal, at least some of the digital logic associated with the external communications interface will be driven by the external clock signal.

For any of various reasons, an external clock signal might be unavailable or unreliable. For example, during initial power-up and/or self-testing of a system, a component intended to receive an external clock signal may be ready before the component intended to generate the signal. Alternatively, service and maintenance operations performed on a component which generates the external clock signal may cause the clock signal to be temporarily lost or corrupted. Noise from any of various other sources, including service or maintenance operations on other devices, especially devices sharing the same communications bus, may have similar effects.

Ideally, the effects of a lost or degraded external clock signal should be limited to the communications medium which it synchronizes. However, this is not always the case. A lost or degraded clock signal may have unpredictable effects on the interface logic, which in some cases can cause unanticipated problems in portions of the component which are not synchronized to the external clock signal.

As the need for supporting a large variety of heterogenous devices in a single system environment grows, as well as the demand for constant availability and concurrent maintenance of systems, it can be expected that the circumstances under which distributed clock signals might be lost or degraded will become more numerous. It is desirable that a system recover as gracefully as possible from loss or degradation of a clock signal. However, the growing heterogeneity of system components and variety of environments makes it increasingly difficult to foresee all the consequences of lost or degraded clocks. Therefore, a need exists for improved techniques to prevent or alleviate the consequences of degraded clock signals.

SUMMARY OF THE INVENTION

An oscillator transmission switching circuit switches between asynchronous oscillator signals with low latency.

In one aspect of the preferred embodiment, the switching circuit has an operational mode, whereby during transition from a first oscillator to a second oscillator, the switching circuit transitions first to a bridge input immediately following an edge of the first oscillator, and holds the output at the bridge input until the same edge of the second oscillator is detected, at which the output switches to the second oscillator.

In another aspect of the preferred embodiment, control of the switching circuit is implemented as a state machine in a plurality of memory elements, which are preferably two-stage latches, which record a state, the latches providing control input to selection logic for selecting among a first oscillator input, a second oscillator input, and a bridge input. Preferably, a fast transition circuit (called a fast set/reset logic) provides the capability to by-pass the latch output under certain conditions for faster transition from one state to another.

Preferably, the bridge input logic level is selectable to accommodate conditions in which the first oscillator signal is stuck at either a logic 0 or a logic 1.

In the preferred embodiment, a fault detection circuit detects the loss or degradation of a primary oscillator signal and automatically triggers a switch to an alternate oscillator signal using the oscillator transmission switching circuit. The detection circuit can also trigger a return to the primary oscillator when the primary oscillator signal is restored. Preferably, a separate external signal can also trigger a switch from one oscillator to another oscillator.

An oscillator transmission switching circuit in accordance with the preferred embodiment of the present invention thus supports relatively seamless and rapid switching from one oscillator signal to another under a range of different asynchronous environments and causative conditions, minimizing disruption to downstream logic which relies on an oscillator signal.

The details of the present invention, both as to its structure and operation, can best be understood in reference to the accompanying drawings, in which like reference numerals refer to like parts, and in which:

BRIEF DESCRIPTION OF THE DRAWING

FIG. 8 is a state table illustrating the operation of the transmission state machine, according to the preferred embodiment.

FIG. 10 represents a switching operation from a primary oscillator to a secondary where fast set/reset logic is not enabled; FIG. 11 represents a switching operation from a primary oscillator to a secondary where fast set/reset is enabled, FIG. 12 represents a switching operation from a primary oscillator to a secondary where the primary is stuck at 0; and FIG. 13 represents a switching operation from a secondary to a primary oscillator, where fast set/reset is enabled.

DETAILED DESCRIPTION OF THE PREFERRED EMBODIMENT

Figure 1:
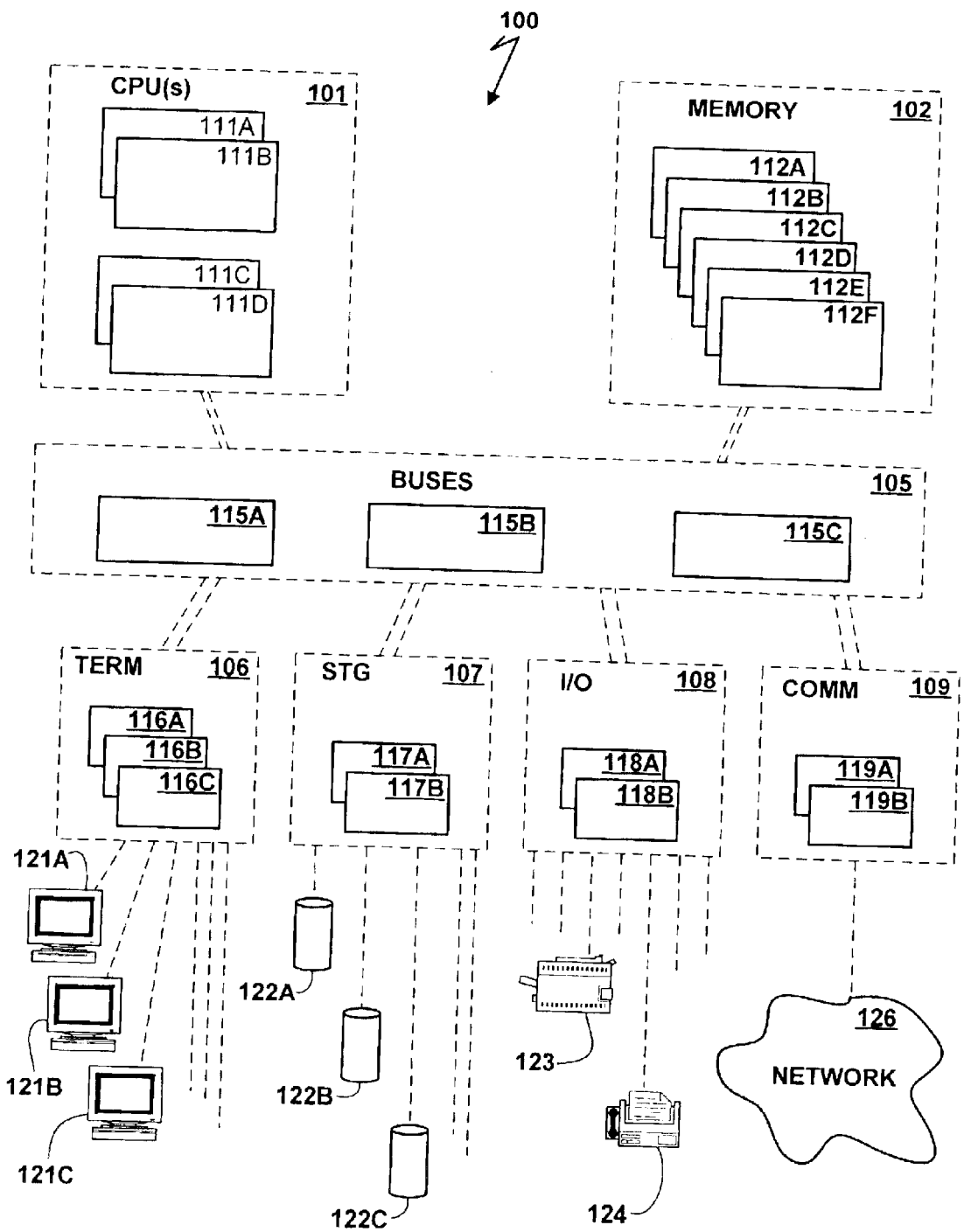
FIG. 1 is a high-level block diagram of the major hardware components of a computer system for utilizing an oscillator switching apparatus, according to the preferred embodiment of the present invention.

Referring to the Drawing, wherein like numbers denote like parts throughout the several views, FIG. 1 is a high-level representation of the major hardware components of a computer system 100 for utilizing an oscillator switching and transmission apparatus, according to the preferred embodiment of the present invention. At a functional level, the major components of system 100 are shown in FIG. 1 outlined in dashed lines; these components include one or more central processing units (CPU) 101, main memory 102, service processor 103, terminal interface 106, storage interface 107, I/O device interface 108, and communications/network interfaces 109, all of which are coupled for inter-component communication via one or more buses 105.

CPU 101 is one or more general-purpose programmable processors, executing instructions stored in memory 102; system 100 may contain either a single CPU or multiple CPUs, either alternative being collectively represented by feature CPU 101 in FIG. 1, and may include one or more levels of on-board cache (not shown). Typically, a relatively large system having multiple power domains will contain multiple CPUs. Memory 102 is a random-access semiconductor memory for storing data and programs. Memory 102 is conceptually a single monolithic entity, it being understood that memory is often arranged in a hierarchy of caches and other memory devices. Additionally, memory 102 may be divided into portions associated with particular CPUs or sets of CPUs and particular buses, as in any of various so-called non-uniform memory access (NUMA) computer system architectures.

Terminal interface 106 provides a connection for the attachment of one or more user terminals 121A–C (referred to generally as 121), and may be implemented in a variety of ways. Many large server computer systems (mainframes) support the direct attachment of multiple terminals through terminal interface I/O processors, usually on one or more electronic circuit cards. Alternatively, interface 106 may provide a connection to a local area network to which terminals 121 are attached. Various other alternatives are possible. Data storage interface 107 provides an interface to one or more data storage devices 122A–C, (referred to generally as 122), which are preferably rotating magnetic hard disk drive units, although other types of data storage device could be used. I/O and other device interface 108 provides an interface to any of various other input/output devices or devices of other types. Two such devices, printer 123 and fax machine 124, are shown in the exemplary embodiment of FIG. 1, it being understood that many other such devices may exist, which may be of differing types. Communications interface 109 provides one or more communications paths from system 100 to other digital devices and computer systems; such paths may include, e.g., one or more networks 126 such as the Internet, local area networks, or other networks, or may include remote device communication lines, wireless connections, and so forth.

Buses 105 provide communication paths among the various system components. Although a single conceptual bus entity 105 is represented in FIG. 1, it will be understood that a typical computer system may have multiple buses, often arranged in a complex topology, such as point-to-point links in hierarchical, star or web configurations, multiple hierarchical busses, parallel and redundant paths, etc., and that separate buses may exist for communicating certain information, such as addresses or status information.

Physically, the major functional units are typically constructed from one or more field replaceable units. Often, such a field replaceable unit is an electronic circuit card assembly. However, a physical unit need not be an electronic circuit card assembly. It could alternatively be a component such as a disk drive storage device 122, a terminal 121, a power supply, and so forth. Additionally, a single physical unit may have one or more FRUs within itself. For larger systems, a single major functional component, such as CPU 101 or memory 102, will often comprise multiple field replaceable units in the form of electronic circuit card assemblies, although it is alternatively possible for more than one major functional component to reside in a single FRU. In FIG. 1, CPU 101 is represented as containing four circuit cards (FRUs) 111A–D, each of which may contain one or more processors; memory 102 is represented as containing six cards 112A–112F, service processor 103 as containing a single card 113, buses 105 as containing three cards 115A–C, terminal interface 106 as containing three cards 116A–116C, storage interface 107 as containing two cards 117A–B, I/O and other interface 108 as containing two cards 118A–B, and communications interface 109 as containing two cards 119A–B.

It should be understood that FIG. 1 is intended to depict the representative major components of an exemplary system 100 at a high level, that individual components may have greater complexity than represented FIG. 1, and that the number, type and configuration of such functional units and physical units may vary considerably. It will further be understood that not all components shown in FIG. 1 may be present in a particular computer system, and that other components in addition to those shown may be present. Although system 100 is depicted as a multiple user system having multiple terminals, system 100 could alternatively be a single-user system, typically containing only a single user display and keyboard input, or might be a server or similar device which has little or no direct user interface, but receives requests from other computer systems (clients).

Figure 2:
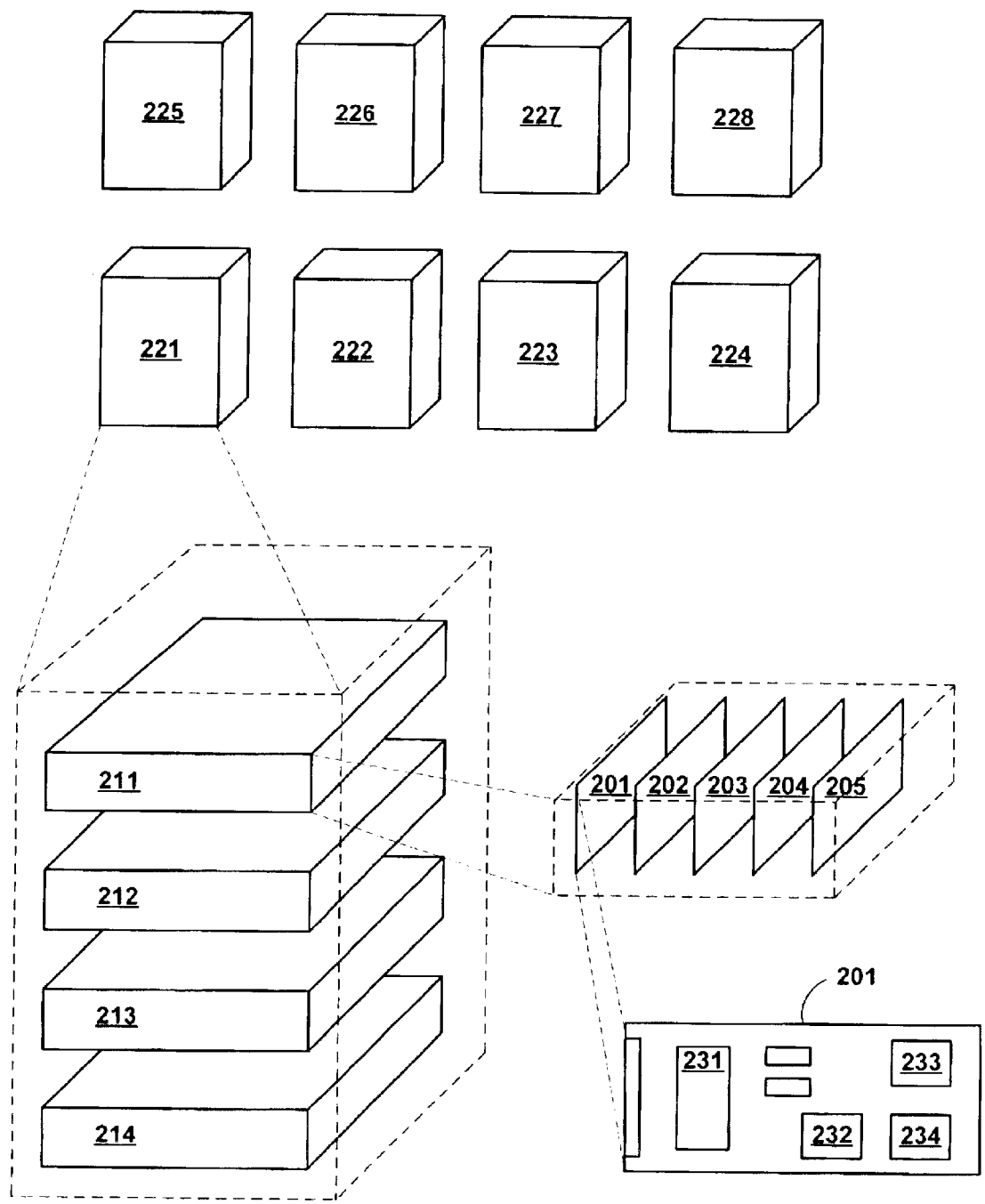
FIG. 2 is a simplified representation of a hierarchy of physical units in the computer system of the preferred embodiment.

FIG. 2 is a simplified representation of the hierarchy of physical units in computer system 100, according to the preferred embodiment. As shown in FIG. 2, an electronic circuit card assembly 201 contains multiple integrated circuit chip modules 231–234 and other components. Although "cards" are shown in FIG. 2 and described in the illustrative embodiment herein, it should be understood that a hardware unit at this level of the hierarchy could be something other than a card. For example, it could be a rotating disk drive storage unit, or some other hardware component. Multiple cards 201–205 are housed in a single card frame assembly 211, which is referred to herein as a "drawer". Multiple drawers 211–214 are housed in a single "rack" 221. In the preferred embodiment, a rack is a large freestanding cabinet housing multiple drawers and auxiliary components, such as power distribution and cooling systems. The drawer is a physical drawer which can be pulled out of the rack for access. It should be understood that the hierarchy of physical units according to the preferred embodiment is simply one physical packaging design implementation for a large computer system, that the number of levels of hierarchical hardware components may vary as well as the design of individual hardware components, and many other variations are possible.

In the exemplary embodiment, system 100 contains multiple power domains. I.e., multiple power supplies provide power to separate sets of physical system components. In particular, in the preferred embodiment each rack 221–228 has its own power supply and distribution hardware (not shown). It will be understood that power domains could be established on a different basis, e.g., each drawer could have its own power domain. It will be further understood that a computer system using an oscillator switch in accordance with the present invention may have only a single common power domain.

Oscillators may be generated at various physical levels for use by various physical components. For example, individual integrated circuit modules 231–234 may contain their own local oscillators; each card 201–205 may contain an oscillator for use by all card components; each drawer 211–214 or rack may contain an oscillator for use by the included components; and finally, one of the components may generate a master oscillator signal for use by the entire system. The different oscillator signals are used for different purposes. For example, a local oscillator within an integrated circuit chip may be used only for internal logic within the chip. Oscillators which are shared by multiple components can be used for inter-component communication, and for synchronizing locally generated oscillators to some more global clock signal.

Under various conditions, it is possible that a relatively more global oscillator signal, which is normally used for driving certain logic within a component, is unavailable, while a relatively more local signal is available as a back-up. For example, where multiple power domains exist, the more global oscillator may be generated in a different power domain, which has not yet powered up during an initialization sequence, or has lost power during operation. Alternatively, concurrent maintenance operations may force power to be shut off to some component, causing loss of an oscillator, or may cause temporary interruption of or noise on a distribution line for an oscillator. In these and other situations, it is desirable to be able to switch seamlessly to a back-up oscillator source (which is generally local in origin) until the more global signal is available. Therefore, in accordance with the preferred embodiment, an oscillator switching circuit is embedded in an integrated circuit module, providing low-latency seamless switching to an alternate oscillator source, and switching back again to the primary source when it becomes available.

Figure 3:
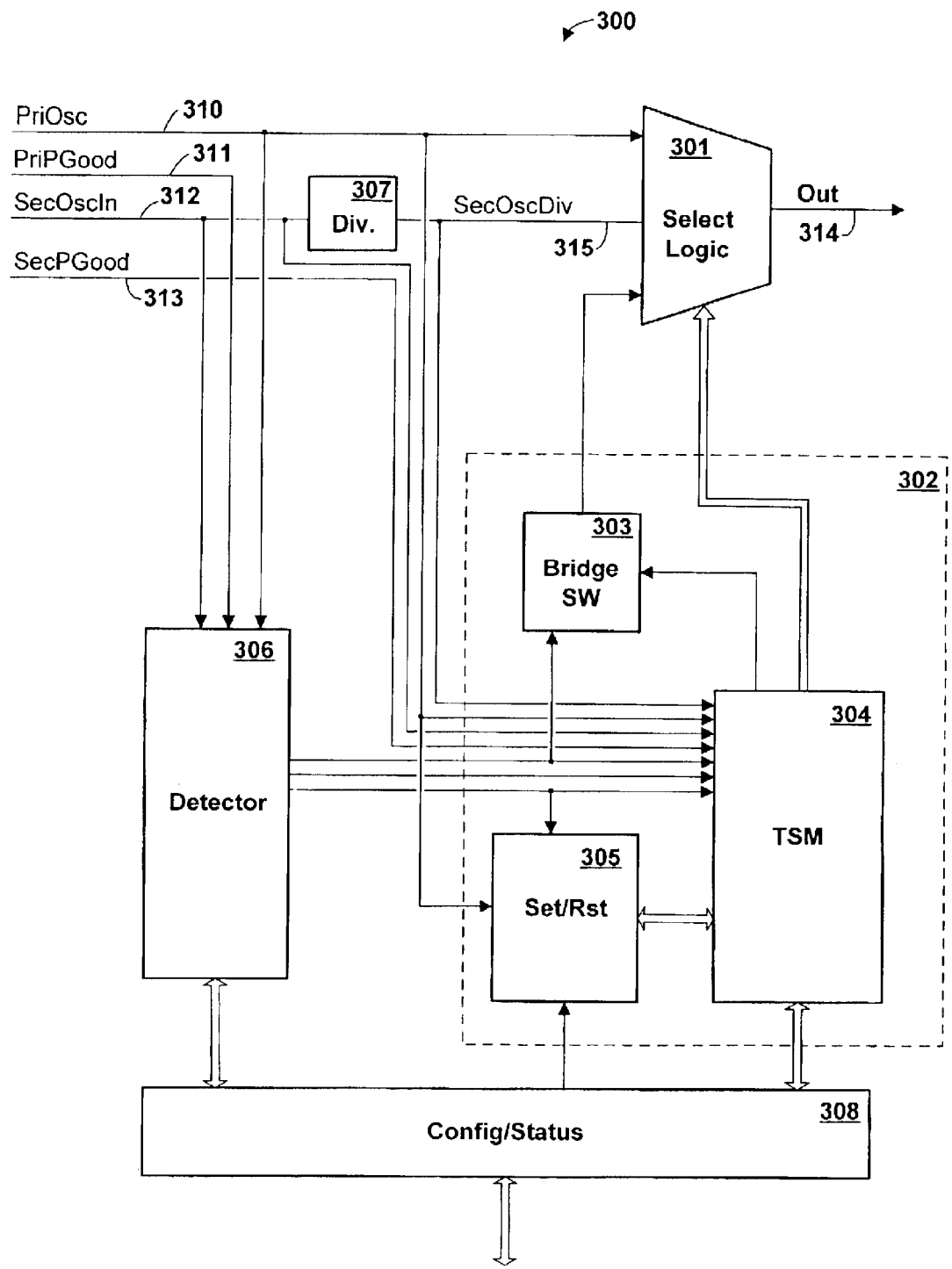
FIG. 3 is a high-level circuit diagram showing the major components of a low-latency oscillator switching circuit, according to preferred embodiment.

FIG. 3 is a high-level diagram showing the major components of a low-latency oscillator switching circuit 300, in accordance with the preferred embodiment of the present invention. Circuit 300 receives four major signal line inputs: a primary oscillator input line (PriOsc) 310, a primary oscillator power good line (PriPGood) 311, a secondary oscillator input (SecOscIn) 312, and a secondary oscillator power good line (SecPGood) 313. PriOsc 310 and SecOscIn 312 are the two input oscillator signals. In the preferred embodiment, it is assumed that PriOsc and SecOscIn each have an approximately 50% duty cycle, although a switching circuit as described herein could, with minor adjustments, be used with different oscillator parameters. PriPGood and SecPGood lines are status lines indicating that power is stable in the primary oscillator and secondary oscillator power domains, respectively. PriPGood line can also be used to signal impending power interruption in the primary power domain, or other actual or impending fault condition in the primary oscillator.

Select logic 301 acts as a multiplexer to select one of three input lines as the switch output on output line 314, the three inputs to select logic 301 being PriOsc 310, an oscillator signal derived from SecOscIn 312, and a bridge signal which is used when switching state from one oscillator signal to the other. Select logic 301 is controlled by transmission switch control logic 302. Preferably, control logic 302 comprises bridge switch 303, transmission state machine 304, and fast set/reset logic 305. Bridge switch 303 determines the state of the bridge signal to select logic 301. This bridge state is normally a logic '1', but where there is a stuck '0' fault, a logic '0' is used for the bridge state. Transmission state machine (TSM) 304 monitors input line status and switches state responsive to pre-defined inputs to control the sequence of line selections made by select logic 301. Fast set/reset logic 305 triggers a transition through the bridge state with minimal latency.

In a typical environment, primary oscillator 310 is a line from an external source in an external power domain, while secondary oscillator (SecOscIn) 312 is a locally generated oscillator source on a local power domain; however, this need not necessarily be the case. In this environment, the primary oscillator is used in normal operating mode for synchronization to some external source, while the secondary signal is available for use as a back-up. The secondary oscillator 312 might also be used within the system for additional purposes beyond a back-up for the primary oscillator. For example, a logic module such as an integrated circuit chip might use the secondary oscillator during normal operation for clocking certain internal logic within the logic module, and the primary oscillator for interface logic which synchronizes communications with other logic modules. In such a case, the interface logic which normally uses the primary oscillator might still maintain partial (although degraded) function with a secondary oscillator. Accordingly, in the preferred embodiment, circuit 300 operates on the assumption that the primary oscillator signal should be passed through the switch whenever it is considered available and reliable, and only when there is something wrong with the primary oscillator signal should the secondary signal be passed through the switch.

Optional frequency divider 307 is used to divide the frequency of the secondary oscillator input (SecOscIn) signal 312, producing an oscillator signal 315 herein designated SecOscDiv, which is input to select logic 301. Because it is generally assumed that the primary oscillator signal is coming from a more remote source, and may be propagated more widely and to a more heterogenous set of devices, than the secondary oscillator, the primary oscillator signal 310 may be at a significantly lower frequency than the secondary input (SecOscIn) 312. Circuit 300 does not require identical frequencies of the two sources, but for various reasons it is desirable to avoid large frequency disparities, and therefore divider 307 may be used to approximate the frequency of the primary oscillator signal. However, it is generally desirable to operate transmission control logic 302 as fast as the circuits will allow, and for this reason the clocks used to operate this logic, and in particular to trigger state changes in TSM 304, are taken directly from SecOscIn, without frequency division. Where frequency divider 307 is not used, SecOscDiv 315 is the same as SecOscIn 312.

Optional detector logic 306 monitors the incoming signals and detects oscillator signal faults, providing appropriate signals to transmission switch control logic 302. It would alternatively be possible to provide detection external to switch 300, or to trigger switch 300 exclusively in response to external control signals. In the preferred embodiment, detector monitors both primary oscillator line 310 and PriPGood line 311 independently for indication of fault. PriPGood line 311 can be used by external logic to signal impending loss or potential loss of the primary oscillator signal, allowing the switch to operate before the primary oscillator actually fails. For example, where concurrent maintenance is to be performed on some component of computer system 100, which may cause interruption of the primary oscillator signal, it would be possible to signal the event in advance so that various system components could switch to respective secondary oscillators until the operation is completed. Alternatively, multiple external signal lines could be provided for signaling actual, impending or potential primary oscillator failures.

Optional configuration & status interface logic 308 contains configuration parameters useful for tuning the switch circuit, such as frequency, delay parameters, and so forth, and provides an external interface for setting the parameters to desired values. In the preferred embodiment, it also contains a fast set/reset enable state bit, which is used for enabling fast set/reset logic 305, as described more fully herein. Interface logic 308 further provides an external interface for reading the oscillator switch state and the detected state of incoming signals.

Figure 4:
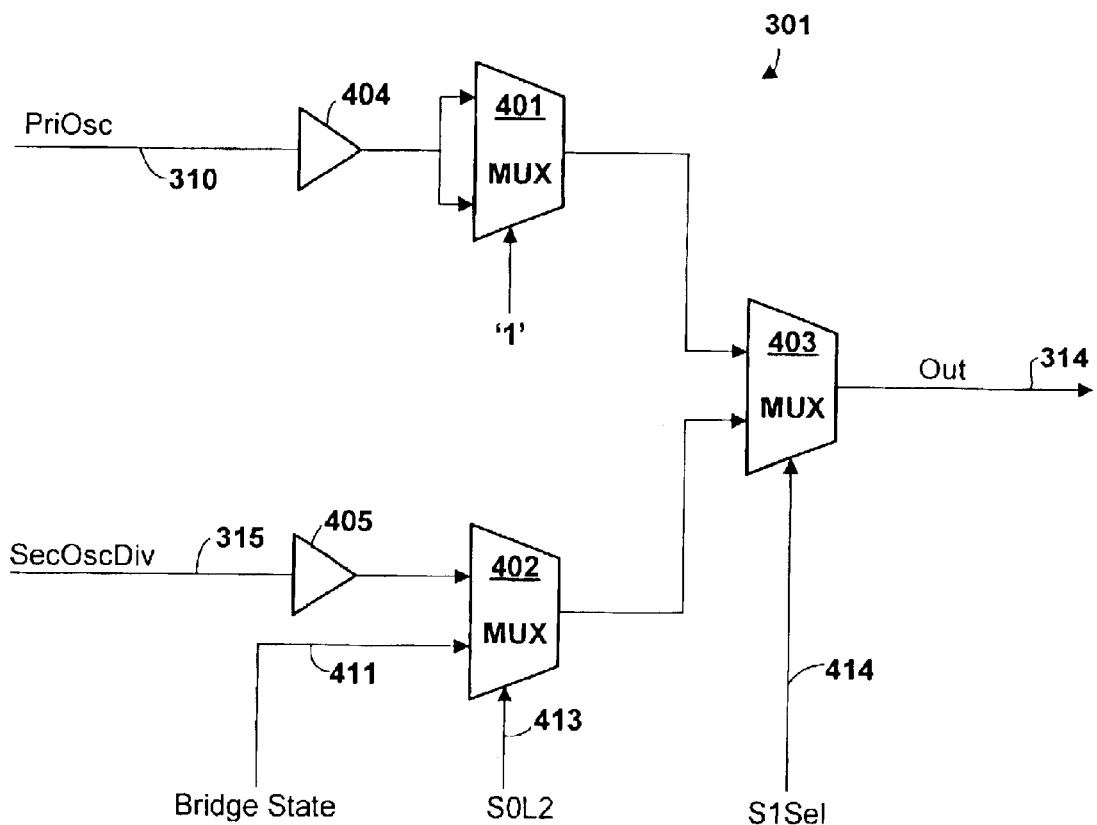
FIG. 4 is a circuit diagram showing in greater detail the major components of selection logic for selecting one of several signals for output, according to the preferred embodiment.

FIG. 4 illustrates in greater detail an implementation of select logic 301, according to the preferred embodiment. Select logic 301 preferably comprises three 2-input multiplexers 401–403, arranged as shown in FIG. 4. Multiplexer 403 receives as inputs the outputs of multiplexers 401 and 402, and selects one of these inputs for output on output line 314, depending on the state of S1Sel control line 414. Multiplexer 402 receives as inputs oscillator signal SecOscDiv 315, and a bridge state 411 which is the output of bridge state switch 303, and selects one of these lines for output, depending on the state of S0L2 control line 413. Both S0L2 and S1Sel (control lines 413, 414) are outputs of transmission state machine 304, explained in greater detail herein. Multiplexer 401 receives as inputs primary oscillator line 310, and is permanently set to select this line for output. Multiplexer 401 thus functions only to match the performance of multiplexer 402, to balance the propagation delays through select logic 301. Optional delay drivers 404,405 are identical delays intended to prevent an output spike during certain conditions of fast set/reset, as explained in greater detail herein. Where the inherent propagation delays of the multiplexer circuitry are greater than the fast set/reset logic, delay drivers 404,405 are unnecessary. Any suitable technology could be used for implementing the multiplexers, but since multiplexer 401 is intended to balance multiplexer 402, it is desirable that both be implemented in identical design. However, it would conceivably be possible to implement multiplexer 403 using a different circuit design.

Figure 5:
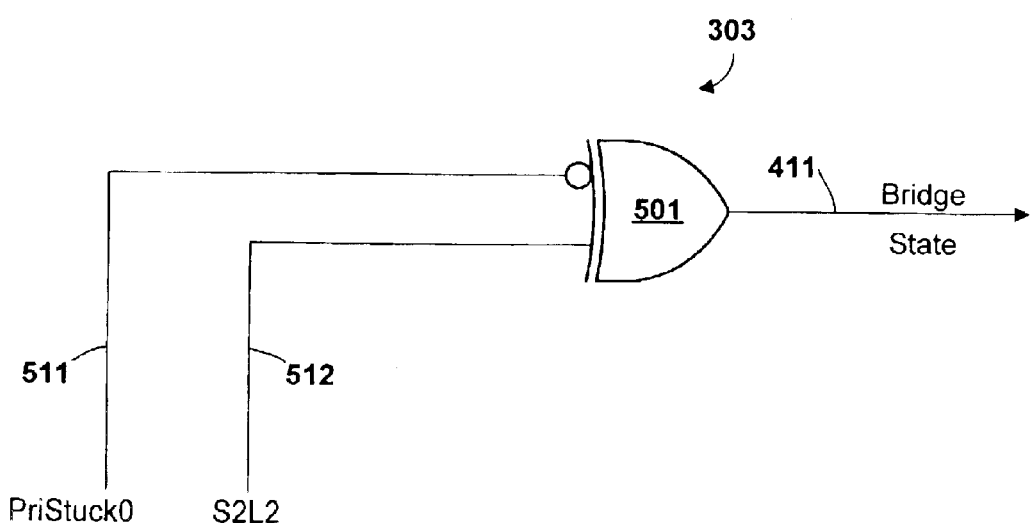
FIG. 5 is a circuit diagram showing in greater detail an implementation of a bridge slate switch for determining the bridge state to the selection logic, according to the preferred embodiment.

FIG. 5 illustrates in greater detail an implementation of bridge state switch 303, according to the preferred embodiment. Bridge state switch 303 is preferably implemented as a simple 2-input XOR gate 501, the inputs being a primary-oscillator-stuck-at-0 (PriStuck0) signal 511 generated by detector 306, and S2L2 state line 512, generated by transmission state machine 304. The output bridge state 411 is logic '1' if either PriStuck0 is logic '0' or if S2L2 is logic 1. (PriStuck0='0' and S2L2='1' should never occur simultaneously, so this state is a "don't care").

Figure 6A:
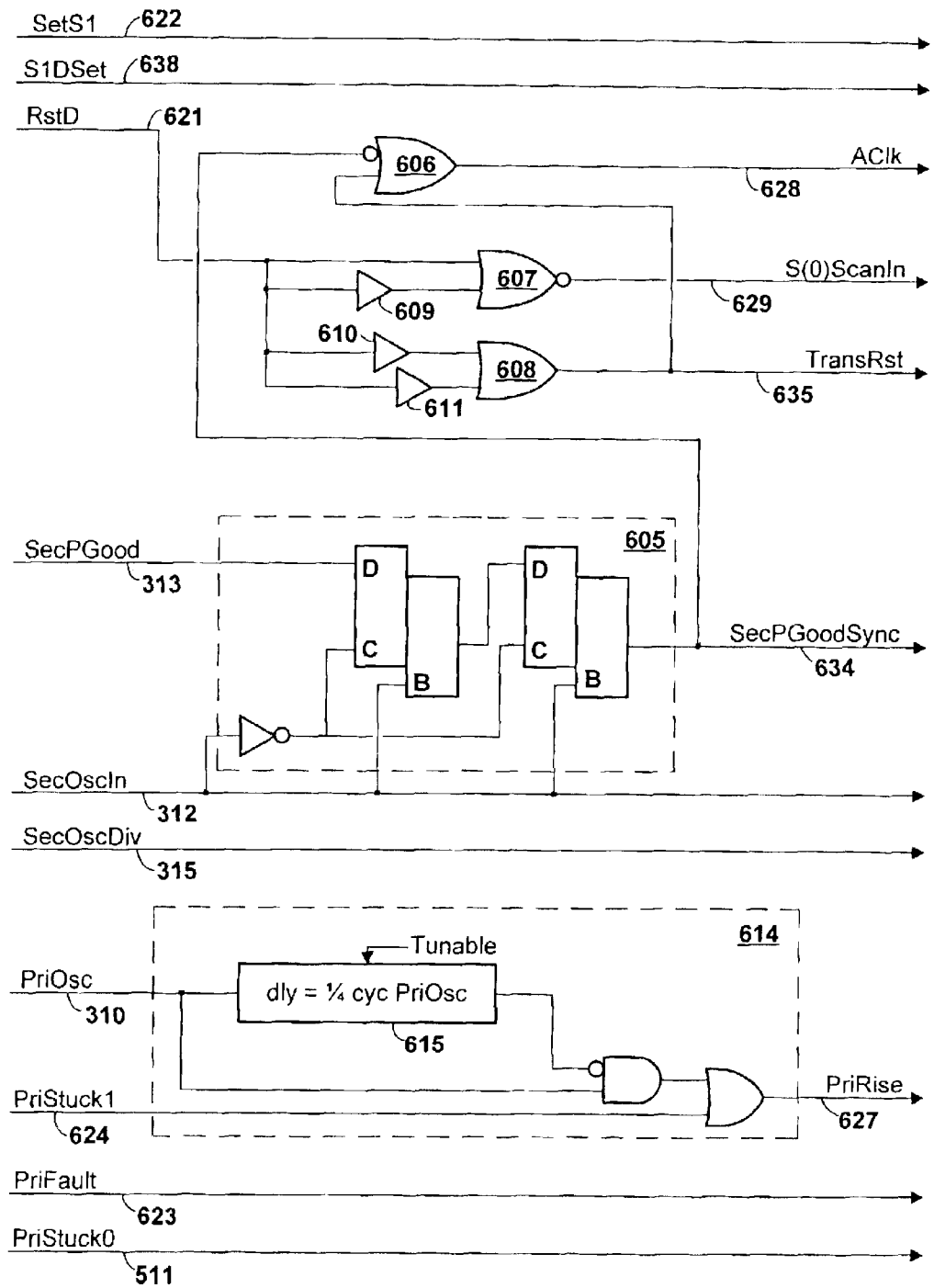
FIGS. 6A, 6B and 6C (herein referred to collectively as FIG. 6) are a circuit diagram showing in greater detail an implementation of a transmission state machine for controlling the sequence of switching events, according to the preferred embodiment.
Figure 6B:
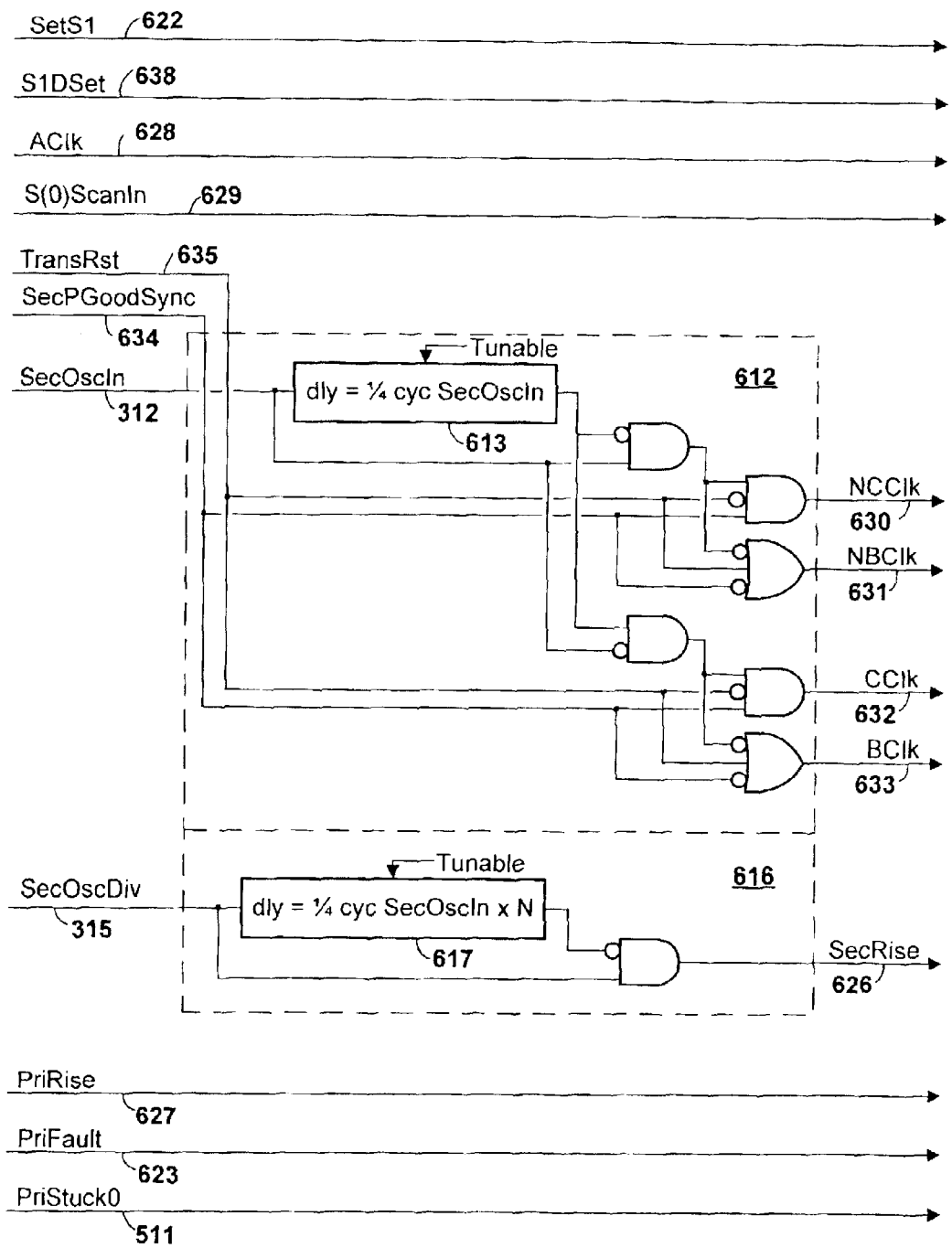
Figure 6C:
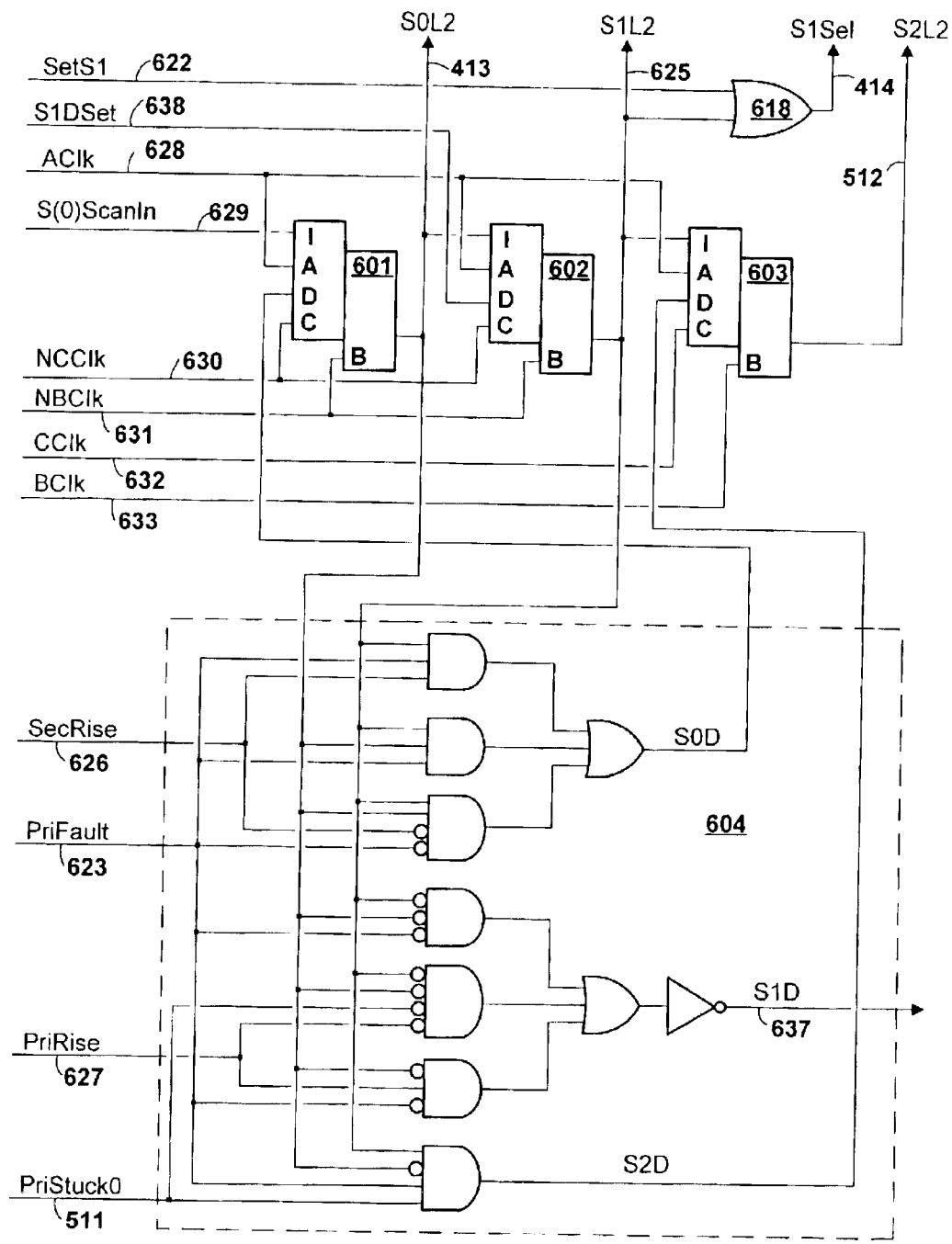

FIGS. 6A, 6B and 6C (herein referred to collectively as FIG. 6) illustrate in greater detail an implementation of transmission state machine 304, according to the preferred embodiment. TSM 304 comprises three major sections: a set of three latches 601–603 which hold the state, combinatorial logic 604 providing input to the latches (both illustrated in FIG. 6C), and logic for generating the various clocks and scan input to the latches (illustrated in FIGS. 6A and 6B).

Transmission state machine 304 receives as inputs PriOsc signal 310, SecOscIn 312, SecOscDiv 315, and SecPGood 313, which come from sources external to switching circuit 300. TSM 304 also receives PriFault signal 623, which is used to indicate a detected or impending fault condition in the primary oscillator, and PriStuck0 signal 511 and PriStuck 1 signal 624, which are used to indicate the special cases in which the primary oscillator is stuck at a 0 logic level or a 1 logic level, respectively. PriFault signal 623, PriStuck0 signal 511 and PriStuck1 signal 624 are generated by detector 306, as explained more fully herein. TSM 304 further receives SetS1 signal 622, S1DSet signal 638 and RstD signal 621, which are used to initiate fast set and reset of switch state to the secondary or primary oscillator, respectively. SetS1 622, S1DSet 638 and RstD 621 are generated by fast set/reset logic 305, as explained more fully herein.

Transmission state machine 304 produces output control lines S0L2 413, S1L2 625 and S2L2 512, being the outputs of the second stages of latches 601–603, respectively. TSM 304 further produces output control line S1Sel 414, which is derived from S1L2 625 and SetS1 622. Control lines S2L2 512 and S1Sel 414 control the selection of inputs enabled by select logic 301. Control line S2L2 controls the bridge state switch 303. Control lines S0L2 413 and S1L2 625 are additionally fed back to the fast set/reset logic 305 to control fast state switches. Transmission state machine 304 further produces output S1D 637. Both S1D 637 and S1L2 are used as inputs by fast set/reset logic 305, to initiate fast set or reset of switch state, as described herein.

Latches 601–603, which collectively record the state at any moment in time, are the heart of state machine 304. In the preferred embodiment, latches 601–603 are identical scannable 2-stage latches having multiple clock inputs, which function as described below (it being understood that other types of latches, or other forms of logic circuitry, could alternatively be used to implement a transmission state machine). The first latch stage receives inputs I, A, D and C. A and C are intended as clocks. Inputs I and D are clocked into the first latch stage on clock signals A and C, respectively. The output of the first latch stage (L1) is clocked into the second stage on clock input B. The output of the second latch stage is designated L2, and is typically used as the latch circuit's external output. This type of latch is commonly usable in a dual mode, whereby it is possible to use input I as a scan line for scanning data into the latch on clock signal A, and to use input D as the normal data input line which is received on clock signal C. The behavior of the latch is summarized in the table below:

| Mode | Inputs | | | | | Outputs | |
|---|---|---|---|---|---|---|---|
| | A | I | D | C | B | L1 | L2 |
| Scan-A | 1 | A | X | 0 | 0 | A | hold |
| Flush | 1 | A | X | 0 | 1 | A | A |
| Capture | 0 | X | D | 1 | 0 | D | hold |
| Release | 0 | X | X | 0 | 1 | hold | L1 |

Referring to the table above, in a typical scan-in mode (Scan-A), clock A is activated to scan data on input line I into the first latch stage. The value in the second latch stage is held. In a flush mode, both clocks A and B are simultaneously high, causing data on input line A to be flushed through both latch stages. In a capture mode, clock C is activated to scan data on input line D into the first latch stage, which the value in the second latch stage is held. In a release mode, the B clock is activated to propagate the value in the first latch stage to the second latch stage. The A and C clocks should never be activated simultaneously, the results being undefined. If clocks B and C are simultaneously on, a race condition exists.

In the preferred embodiment, the A clock input is used to flush the latches to establish an initial state, or to perform a fast reset to the default state. Because it is assumed that the local oscillator (SecOscIn, and its derivative SecOscDiv) may be available before the PriOsc, latches 601–603 are initialized to logic 1 by flushing with the A clock, causing muxes 402, 403 to transmit the SecOscDiv signal through output 314. Latch 603 then reverts to a logic 0, but this does not affect the output. When the input indicates that PriOsc is available, the switch will automatically restore PriOsc as the default output. When performing a fast reset, the A clock flushes a logic 0 through the latches, establishing them in the default (PriOsc transmitted) state. The A clock is normally 0 (inactive), and only activated briefly to flush the latches.

Referring to FIG. 6A, a synchronized secondary power good signal (SecPGoodSync) 634 is produced by passing SecPGood 313 through a pair of latches 605 clocked by SecOscIn 312, which assures that SecPGoodSync rises after SecOscIn 312 is active and avoids pulse-chopping the clocks generated from SecOscIn. AClk 628 is produced by gate 606 as the logical OR of the complement of SecPGoodSync 634 and TransRst signal 635, the latter being used to trigger fast reset to default. At initialization, SecPGoodSync 634 is initially low, driving AClk 628 high and flushing the latches. Regardless of the initial value of RstD 621, flushing the latches eventually causes RstD to fall, driving the output of NOR gate 607 (i.e., S(0)ScanIn 629) high, so that the latches stabilize at logic 1. When AClk 628 drops after SecPGoodSync is established, the latches are thus initialized to a value of 1. After initialization, TransRst signal 635 produced by OR gate 608 is normally 0, and goes high only briefly to drive the AClk during fast reset, as explained more fully herein.

Referring to FIG. 6B, tunable clock circuit 612 produces B/C clock inputs to latches 601–603 from SecOscIn 312.

SecPGoodSync 634 and TransRst 635 act as enablement signals which are normally logic 1 and 0, respectively, enabling the various B/C clocks. The C clock input to latches 601 and 602, designated NCClk 630, is a pulse approximately ¼ as long as the secondary oscillator period, which rises with SecOscIn 312. The B clock input to latches 601 and 602, designated NBClk 631, is essentially the complement of the NCClk input. The C and B clock inputs to latch 603, designated CClk 632 and Bclk 633, respectively, are 180 degrees out of phase with NCClk and NBClk. Clock circuit 612 illustrated in FIG. 6B is a conceptual illustration; in reality, the different B/C clock phases are generated using a chopper or splitter circuit, which automatically produces a small gap between B and C clocks (typically 10–30 psec), and which thus avoids any possible race conditions in the latches.

Figure 7:
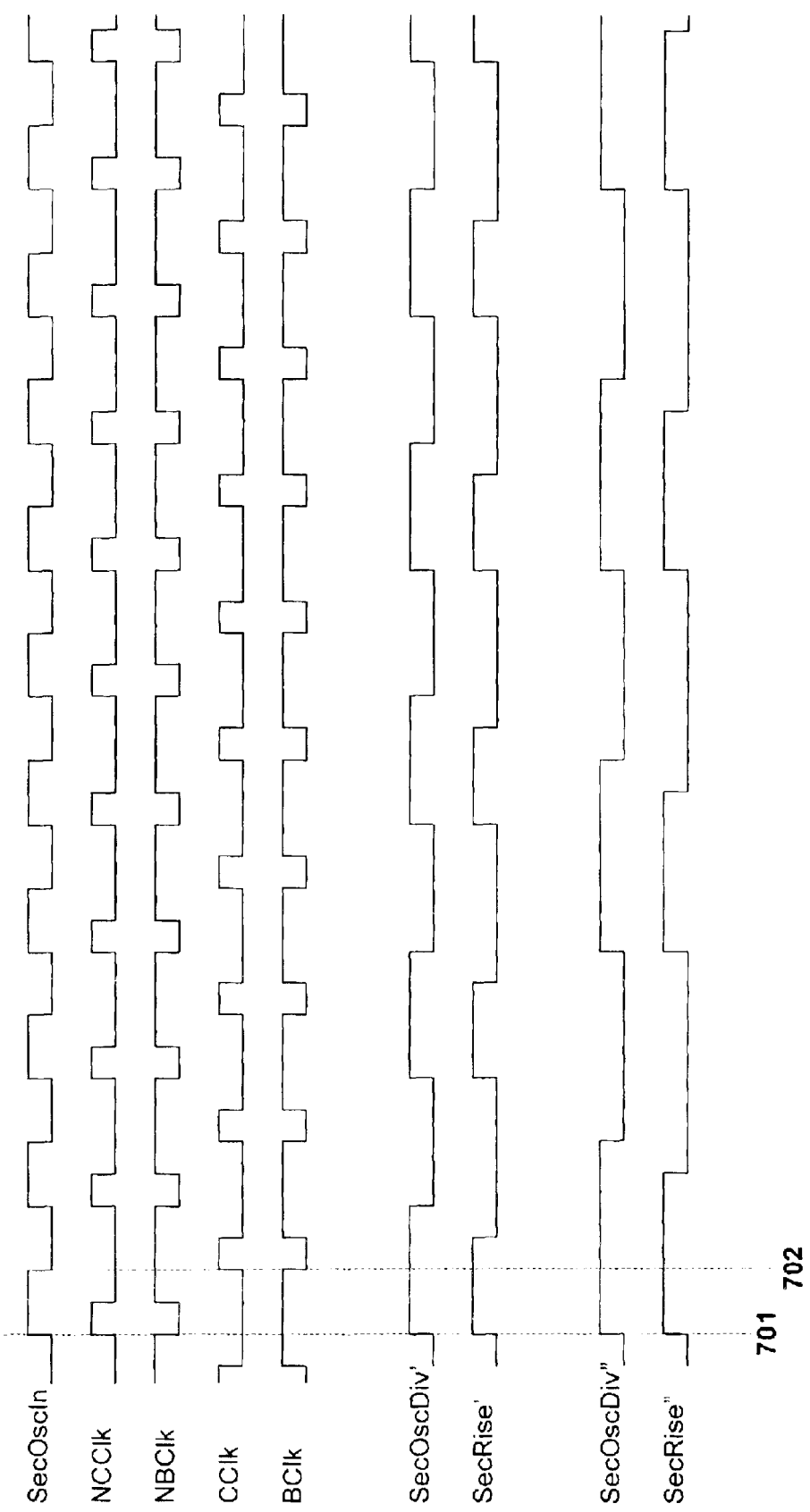
FIG. 7 is a timing diagram showing the timing of various clocks and input for the state machine latches, according to the preferred embodiment.

FIG. 7 is a timing diagram showing the timing of the various B/C clocks relative to SecOscIn, which is the source for all these signals. Referring to FIG. 7, the NCClk rises and the NBClk falls on each rising edge 701 of SecOscIn, while the CClk rises and the BClk falls on each falling edge 702 of SecOscIn.

Tunable delay 613 can be used to adjust the length of the NCClk and CClk pulses, to assure that adequate time is available in the remaining portion of the SecOscIn clock cycle to allow propagation of signals through the combinatorial logic and latches of the state machine. Preferably, this delay is approximately ¼ cycle of SecOscIn, although this delay might be adjusted depending on the speed of the logic vis-a-vis that of the clocks. The B/C clocks for latch 602 are 180 degrees out of phase in order to enable a bridge state transition from 0 to 0 in mid-cycle, as explained in greater detail herein.

Tunable circuit 616 produces SecRise signal 626 for input to combinatorial logic 604. SecRise is an oscillating signal synchronized to the rising edge of SecOscDiv 315, but having a slightly shortened pulsewidth. As shown in FIG. 6B, SecRise 626 is produced from the SecOscDiv signal 315, as opposed to the SecOscIn signal used to produce the various state machine clocks. SecRise signal 626 enables certain transitions between the SecOscDiv input 315 to mux 402 and the bridge state, which should only occur when SecOscDiv is high. Tunable delay 617 is used to adjust the length of the SecRise pulse, so that it is sufficiently less than the SecOscDiv pulse to allow adequate time for the logic to transition before SecOscDiv can fall. Tunable delay 617 is preferably an integer multiple of the delay 613 used to produce the various clock signals, e.g. approximately ¼ cycle of SecOscIn. Structuring delay 617 as an integer multiple of delay 613 reduces the number of tuning parameters and simplifies the implementation. Where SecOscDiv is the same as SecOscIn (optional frequency divider 307 is not present), then the fall of NCClk is guaranteed to occur in the middle of the SecOscDiv pulse, and circuit 616 is unnecessary; in this case, it is safe to pass SecOscDiv directly through to SecRise as input to combinatorial logic 604. The output of the delay and AND gate is logically ORed with PriStuck 0 so that SecRise will be held high in the event of a stuck 1 fault, so that it will be guaranteed to be captured by an asynchronous clock.

Preferably, the delay in the SecRise circuit is set so that the SecRise pulse is approximately ¼ cycle length of SecOscIn shorter than the SecOscDiv pulse. I.e., where SecOscIn and SecOscDiv are the same signal, SecRise has the same timing as the NCClk. (In this case, SecRise and NCClk fall at the same time, and the propagation delays through combinatorial logic 604 is generally sufficient to assure that SecRise is captured by the fall of NCClk; where this is not so, an additional small fixed delay could be added to delay 617 for producing the SecRise pulse). Where SecOscDiv and SecOscIn are not the same (i.e., SecOscDiv is some lower frequency), SecRise may span multiple cycles of NCClk. FIG. 7 illustrates two additional examples of SecOscDiv signals at lower frequencies, designated SecOscDiv' and SecOscDiv", and their corresponding SecRise signals, designated SecRise' and SecRise", respectively.

Referring again to FIG. 6A, tunable circuit 614 produces PriRise signal 627. PriRise is an oscillating signal synchronized to PriOsc, with a pulse ¼ as wide as the PriOsc cycle. The shortened pulsewidth signal is used as input to the state machine and set/reset logic, to assure that any transition triggered by the rise of PriRise 627 (i.e., the rise of PriOsc) will propagate through the logic to muxes 402, 403, before PriOsc falls.

FIG. 6C represents the central part of state machine 304, containing latches 601–603 and combinatorial input logic 604. Logic 604 produces the D inputs for latches 601–603 from six input values: S0L2 and S1L2 (being the current state of latches 601 and 602, respectively); PriFault 623 and PriStuck0 511 (being fault signals generated by detector logic 306); and SecRise 626 and PriRise 627 (being shortened pulsewidth signals synchronized to SecOscDiv and PriOsc, respectively, and derived from internal state machine circuitry, as previously described). The output lines S0D, S1D and S2D of combinatorial logic 304 correspond to the D inputs to latches 601–603, respectively. However, in the case of S1D 637, this latch input is not fed directly to latch 602, but first passes through fast set/reset logic 305, as explained in greater detail herein.

FIG. 8 is a state table illustrating the operation of transmission state machine 304, according to the preferred embodiment. The table of FIG. 8 shows the six inputs and three outputs of combinatorial logic 604. I.e., for various state conditions, the state table of FIG. 8 shows the outputs which should be produced on output lines S0D, S1D and S2D, in response to the indicated inputs on the six input lines. The state table thus amounts to a definition of the function implemented by combinatorial logic 604. The combinatorial logic 604 illustrated in FIG. 6C is simply one possible implementation of the functions which logically generate the three outputs from the six inputs, as defined by the state table. It will be appreciated that different combinations of logic gates and inputs could be used to implement the logical functions defined by the state table. The optimal implementation in any given environment may depend on many factors, including technologies used for implementing logic gates, circuit layout tools, and so forth.

The transmission state machine 304 is designed to use a logic 1 bridge state when switching from one oscillator to another. A transition from a logic 0 bridge to a logic 1 bridge state is performed in the special case of a switch from a primary oscillator stuck 0 fault. In the more general case where PriOsc is not stuck at 0 (it is at a logic 1 at least some of the time), the following sequence of events occurs when switching from PriOsc to SecOscDiv: (a) PriRise at logic 1 (i.e., the leading half of the PriOsc pulse) is observed by NCClk; (2) Bridge state (logic 1) is entered on the rise of NBClk; and (3) the following rise of NCClk, followed by NBClk, switches from the bridge state (logic 1) to SecOscDiv, which is also at logic 1.

Referring to FIG. 8, rows 1–6 of the table represent a transition from PriOsc 310 to SecOscDiv 315. The first row represents a state in which PriOsc 310 is stable (PriFault=0)

and being transmitted through switch 301, i.e., the default state. In the default state, all latch inputs and all latch outputs are 0. Latch output S1L2 effectively sets line S1Sel 414 to 0, causing mux 403 to transmit the primary oscillator signal to output 314.

The second row indicates a condition in which a primary oscillator fault (other than a stuck 0 fault) is signaled on PriFault line 623. I.e., the fault could be a stuck 1 fault detected by detector 306, or an externally signaled fault such as a pulsewidth fault or impending fault condition. At row 2, the state machine waits for a rise of PriRise 627. At row 3, the rise in PriRise 627 is detected, causing S1D 637 (effectively the D input to latch 602) to go to logic 1. In order to make the transition from row 3 to row 4, the rise in PriRise 627 must be captured by NCClk before PriRise 627 and S1D fall. At row 4, the output of latch 602 (S1L2) has risen to 1, and the state machine waits for SecRise 626 to rise. The rise of S1L2 causes S1Sel 414 to rise, so that mux 403 switches to the output of mux 402. Because S0L2 is still 0, mux 402 selects the bridge state 411 (which in this instance is a logic 1). Therefore, a subsequent fall of PriOsc 310 before the rise of SecRise 626 will not affect the output, since the output is held high at the bridge state. At row 5, the rise of SecRise 626 is detected, causing S0D to rise. At row 6, the output of latch 601 (S0L2) has risen in response to the rise of S0D. The rise S0L2 causes mux 402 to switch from the bridge state to SecOscDiv 315. The switching circuit is now transmitting the SecOscDiv signal in a stable state.

In general, it is expected that the SecOscIn frequency is approximately equal to or greater than PriOsc frequency. In the case where SecOscIn frequency is much less than PriOsc frequency, the data propagation time on the NBClk/BClk cycle may need to be limited. In this case, the PriOsc may switch state prior to the state machine response. I.e., after the rise of PriRise is observed at NCClk, (row 3), causing S1D to rise, PriOsc may fall before S1D propagates through latch 602 to S1L2 and causes S1Sel to rise (row 4), causing a chopped pulse at logic 0, between the fall of PriOsc and the switch to the bridge state at logic 1. This situation can be avoided by tuning the delay 613 to extend NCClk to nearly the full SecOscIn pulsewidth, leaving only a short data propagation period (between the fall of NCClk and the fall of SecOscIn) of approximately ¼ the period of PriOsc. Where the SecOscIn frequency is approximately equal to or greater than that of the PriOsc, this problem does not exist.

Rows 7–11 of the table represent a transition from PriOsc 310 to SecOscDiv 315, in the special case where the primary oscillator is stuck at 0. In this case, the transition is made through a bridge state of logic 0. Row 7 represents a state in which PriOsc 310 is stable (PriFault=0) and being transmitted through switch 301, which is the same as the state represented in row 1. Row 8 indicates a condition in which a stuck 0 primary oscillator fault is detected, as signaled by PriFault line 623 and PriStuck0 line 511. In this case, PriOsc is necessarily a 0, although combinatorial logic 604 considers it a "don't care". The detection of the stuck 0 condition causes the S1D input to latch 602 to rise. At row 9, the logic 1 at the S1D input has propagated through latch 602 to its output S1L2, and SecRise 626 is low. The state machine waits for SecRise 626 to rise. The rise of S1L2 causes S1Sel 414 to rise, so that mux 403 switches to the output of mux 402. Because S0L2 is still 0, mux 402 selects the bridge state 411. In this instance, PriStuck 0 is logic 1, and S2L2 is still a logic 0, so the bridge state is a logic 0. This is the same as the PriOsc state, and no discontinuity is caused by switching to the bridge state. The rise of S1L2 also causes the S2D input to latch 603 to rise. This logic 1 at S2D is clocked through latch 603 one-half cycle after the rise of S1L2 (the clocks for latches 602 and 603 being 180 degrees out of phase), causing the S2L2 output to go high. This in turn switches the bridge state to a logic '1'. At row 10, the rise of SecRise 626 (rise of the SecOscDiv) is detected, causing S0D to rise. At row 11, the S0D logic 1 has propagated through latch latch 601 to output S0L2. The rise S0L2 causes mux 402 to switch from the bridge state to SecOscDiv 315, and switches the S2D input signal off. The switching circuit is now transmitting the SecOscDiv signal in a stable state.

Rows 12–17 of the table represent a transition restoring the switch from SecOscDiv 315 to PriOsc 310. Row 12 represents a state in which SecOscDiv 315 is being transmitted through switch 301, which is the same as rows 11 and 6. Latch output S0L2 and S1L2 are logic 1, and latch output S2L2 is logic 0. The switch is restrained from switching to the default state (transmitting PriOsc) by the presence of a logic 1 on PriFault line 623. At row 13, PriFault drops to 0, indicating that PriOsc 310 is now available. The state machine waits for the rise of SecRise 626 (i.e., the rise of SecOscDiv). At row 14, the rise in SecRise is detected, causing the S0D input (to latch 601) to drop to logic 0. At row 15, the output of latch 601 (S0L2) has fallen to 0 responsive to the change in S0D input, and the state machine waits for PriOsc 310 to rise. The fall of S0L2 causes mux 402 to select the bridge state 411 (which in this instance is a logic 1). Therefore, a subsequent fall of SecOscDiv 315 before the rise of PriOsc 310 will not affect the output, since the output is held high at the bridge state. At row 16, the rise of PriOsc 310 is detected, causing S1D to fall. At row 17, the output of latch 602 (S1L2) has fallen in response to the fall of S1D. The fall of S1L2 causes S1Sel 414 to fall, which switches mux 403 from the output of mux 402 (the bridge state) to the output of mux 401 (PriOsc 310). The switching circuit is now transmitting the PriOsc signal in a stable state.

If the frequency of the SecOscIn is approximately equal to that of the PriOsc, there may be instances in which the switch as described above requires a significant number of cycles to change from one oscillator source to the other. Specifically, in order to make the state transition from row 2 to row 3, or from row 15 to row 16, the transmission state machine must wait until the PriOsc is high simultaneously with the fall of the NCClk. If the two clocks are near the same frequency and substantially out of phase, it could be many cycles before sufficient alignment occurs to trigger the state transition. In the preferred embodiment, an additional fast set/reset circuit 305 is used to trigger the state transition on the first rise of PriOsc, and to immediately jump to the bridge state (row 4, in the case of a switch from PriOsc to SecOscDiv), or to the PriOsc stable state (row 17, in the case of a switch from SecOscDiv to PriOsc.

Figure 9:
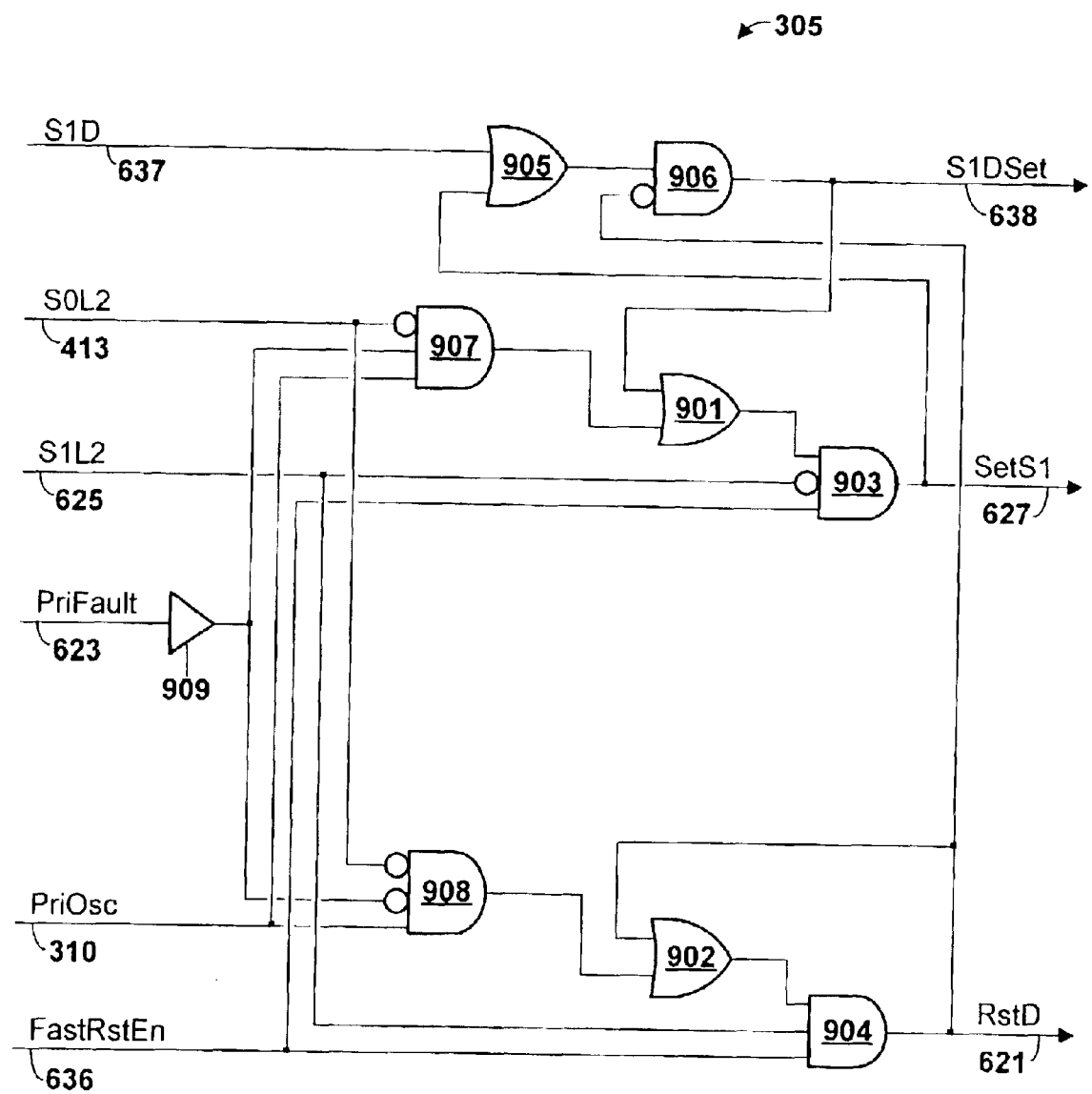
FIG. 9 is a circuit diagram showing in greater detail an implementation of fast set/reset logic, according to the preferred embodiment.

FIG. 9 is a circuit diagram showing in greater detail an implementation of fast set/reset logic 305, according to the preferred embodiment. As shown in FIG. 9, fast set/reset logic 305 receives as inputs S0L2 413, S1L2 625, S1D 637 and PriRise 627 (from TSM 304); PriFault 623 from detect circuit 306, and a fast set/reset enable line (FastRstEn) 634. Fast set/reset logic produces three outputs: SetS1 622, S1DSet 638 and RstD 621.

FastRstEn 636 is an enabling line which is selectively configured to either enable or disable fast set/reset logic 305. FastRstEn is preferably derived from a register bit in configuration & status interface logic 308. Where FastRstEn is set to 0 (fast set/reset logic 305 is disabled), output lines SetS1 622 and RstD 621 are held at logic 0 by AND gates 903, 904, and output S1DSet 638 simply passes S1D 637 through OR gate 905 and AND gate 906. In general, the switching circuit will operate with reduced latency if FastRstEn is set to enable the fast set/reset logic, and therefore it is assumed that the logic will generally be enabled. However, there may be unusual circumstances in which a circuit designer would wish to disable this feature, and for that reason a capability to selectively enable or disable it is included. As an alternative, it would be possible to remove the enabling line and simply enable fast set/reset logic at all times.

If FastRstEn 636 is high (enabled), fast set/reset logic 305 works as follows. Both SetS1 622 and RstD 621 are normally quiescent at logic 0, and in this state S1D 637 simply passes unchanged through gates 905, 906 to output S1DSet 638. When performing a "Fast Set" (i.e., a transition from PriOsc to SecOscDiv), S0L2 and S1L2 are both initially 0 (PriOsc being transmitted through select logic 301). PriFault rises to signal a fault. AND gate 907 will be triggered by PriRise, causing OR gate 901 and AND gate 903 to trigger, and signal SetS1 622 to rise. The rise of SetS1 further triggers OR gate 905 and AND gate 906, causing S1DSet 638 to rise. Feedback loop from S1DSet 638 to the input of OR gate 901 then holds both SetS1 622 and S1DSet 638 at logic 1, until S1L2 rises to shut off AND gate 903. The triggering conditions for AND gate 907 are the same as those present at row 3 of the state table of FIG. 8. However, SetS1 and S1DSet operate independently of the SecOscIn clock, or any of the clocks derived from it, and so do not require synchronization to any of the SecOscIn derived clocks. This means that SetS1 and S1DSet will rise and cause a state transition to the bridge state without waiting for the first half of the PriOsc pulse to be captured by the NCClk, which could take multiple cycles. SetS1 622 feeds directly to OR gate 618 to cause S1Sel 414 to rise, regardless of the state of the SecOscIn clock. The rise in S1Sel causes muxes 402, 403 to select the bridge state.

At the same time, S1DSet 638 is the D input to latch 602 (see FIG. 6C). Latch 602 must still wait for a falling edge of NCClk before the D input is stored in the latch and can pass to output S1L2. However, because the state of S1DSet 638 is locked by the feedback loop to OR gate 901, the rise of the D input to latch 602 will be stored on the next fall of the NCClk, even if PriRise has fallen (and AND gate 907 shuts off) before NCClk falls.

After the D input to latch 602 is clocked into the latch by the fall of NCClk, S1L2 rises and causes AND gate 903 to shut off, allowing SetS1 622 to return to its quiescent state (logic 0). However, since S1L2 has already risen, S1Sel 414 (the output of OR gate 618) remains high. With SetS1 (and RstD) in their quiescent state, S1DSet is again the same as S1D.

When performing a "Fast Reset" (i.e., a transition from SecOscDiv to PriOsc), S0L2 and S1L2 are both initially 1 (SecOscDiv being transmitted through select logic 301) and PriFault is high. PriFault falls to signal that PriOsc is now available for use. Since SecOscDiv is synchronized to the NCClk, the state machine transitions to the bridge state on SecRise without a long latency (i.e., transitions from line 13 of the table of FIG. 8 through line 15). In the bridge state, S0L2 is 0 and S1L2 is 1. AND gate 908 is then triggered by PriRise 627, causing OR gate 902 and AND gate 904 to trigger, and output signal RstD 621 to rise. Once triggered, the feedback loop to OR gate 902 keeps RstD at logic 1, until S1L2 falls. The triggering conditions are the same as those present at row 16 of the state table of FIG. 8. However, RstD operates independently of the SecOscIn clock, or any of the clocks derived from it, providing immediate transition to the PriOsc stable state, without waiting for PriRise to coincide with the NCClk. RstD triggers a long logic 1 pulse on TransRst line 635 and a long logic 0 pulse on S(0)ScanIn line 629. Delays 609, 610 and 611 are set so that the logic 0 pulse on S(0)ScanIn is slightly wider than the TransRst pulse. E.g., delays 609, 610 and 611 might be set to 260 psec, 10 psec, and 250 psec, respectively. The pulse on TransRst line 635 triggers a corresponding pulse on AClk 628, while the C clocks (NCClk and CClk) are temporarily held at logic 0 and the B clocks (NBClk and BClk) are temporarily held at logic 1. The pulse on the AClk scans the logic 1 on S(0)ScanIn through latches 601–603, effectively setting all the latches to logic 1. With a logic 1 in latch 602, S1L2 goes high and shuts off RstD, allowing the circuit to settle at the default state, represented by row 17 of the state table in FIG. 8.

Fast reset logic effectively by-passes certain state transitions in the state table which would otherwise require events to occur synchronous with a clock derived from the SecOscIn signal. Allowing events to occur asynchronous to the SecOscIn clocks has the potential for causing mischief. In order to avoid potential chopped output pulses when using the fast set/reset logic of the preferred embodiment, the following two timing rules should be observed: (1) The propagation delay of a bridge state transition at the input to mux 403 as a result of a change in PriStuck0 should be less than the propagation delay of the fast set/reset logic to S1Sel control input 414 to mux 403; and (2) The propagation delay of the fast set/reset logic to S1Sel control input 414 to mux 403 should be less than the propagation delay of the PriOsc signal to mux 403.

The first condition guarantees that when a PriOsc stuck 0 fault is detected (line 8 of the state table), the bridge state, which is normally high, will fall to 0 as a result of PriStuck0 going high, before S1Sel 414 switches mux 403 to receive the output from mux 402. If this condition is not met, mux 403 could switch to the mux 402 output while bridge state is still in its default logic 1 state, causing a very short output transition from logic 0 (PriOsc is stuck at logic 0) to the logic 1 bridge state, and back again to logic 0 when the bridge state drops as a result of PriStuck0 going high. If the inherent delays in the logic circuit layout are insufficient to assure that the first condition is met, an optional delay driver 909 can be inserted at the PriFault inputs to AND gates 907 and 908, as shown in FIG. 9.

The second condition guarantees that, when performing a switch from PriOsc to SecOscDiv, the fast set/reset logic will switch mux 403 to the bridge state (high) before PriOsc can fall. Specifically, if PriOsc is near the end of the logic 1 pulse and PriFault rises (e.g., as a result of an external signal), the fast set/reset logic will respond to the rise of PriFault by triggering gates 907, 901, 903 and 618, causing mux 403 to switch to the bridge state at logic 1. If PriOsc falls immediately after PriFault rises, a possible race condition exists, whereby the output could see the fall of PriOsc before mux 403 switches. The second condition guarantees that this not happen. If the inherent delays in the logic circuit layout are insufficient to assure that the second condition is met, optional delay drivers 404, 405 may be inserted in the input paths of the oscillator signals. Optional delay driver 405 is not strictly necessary in this case, and is added only to balance the timing delays, for simplicity of downstream control and analysis.

FIGS. 10–13 illustrate the timing of various signals in the circuit of the preferred embodiment under certain switching conditions. In the examples of FIGS. 10–13, the SecOscIn signal 312 is the same as SecOscDiv 315 (both being designated simply "SecOsc"), it being understood that this is not necessarily the case, as explained above. Where SecOscIn is at a higher frequency than SecOscDiv, some state transitions may occur more rapidly than illustrated in the examples. Furthermore, in the examples of FIGS. 10–13, the SecOscDiv is at a frequency approximately one-half that of PriOsc. The different frequencies are used in this example for clarity of illustration, to make it easier to distinguish signals derived from one or the other. Typically, it is expected that SecOscDiv will be near the frequency of PriOsc. However, the circuit of the preferred embodiment will function under a wide range of input conditions, including those shown in the examples.

Figure 10:
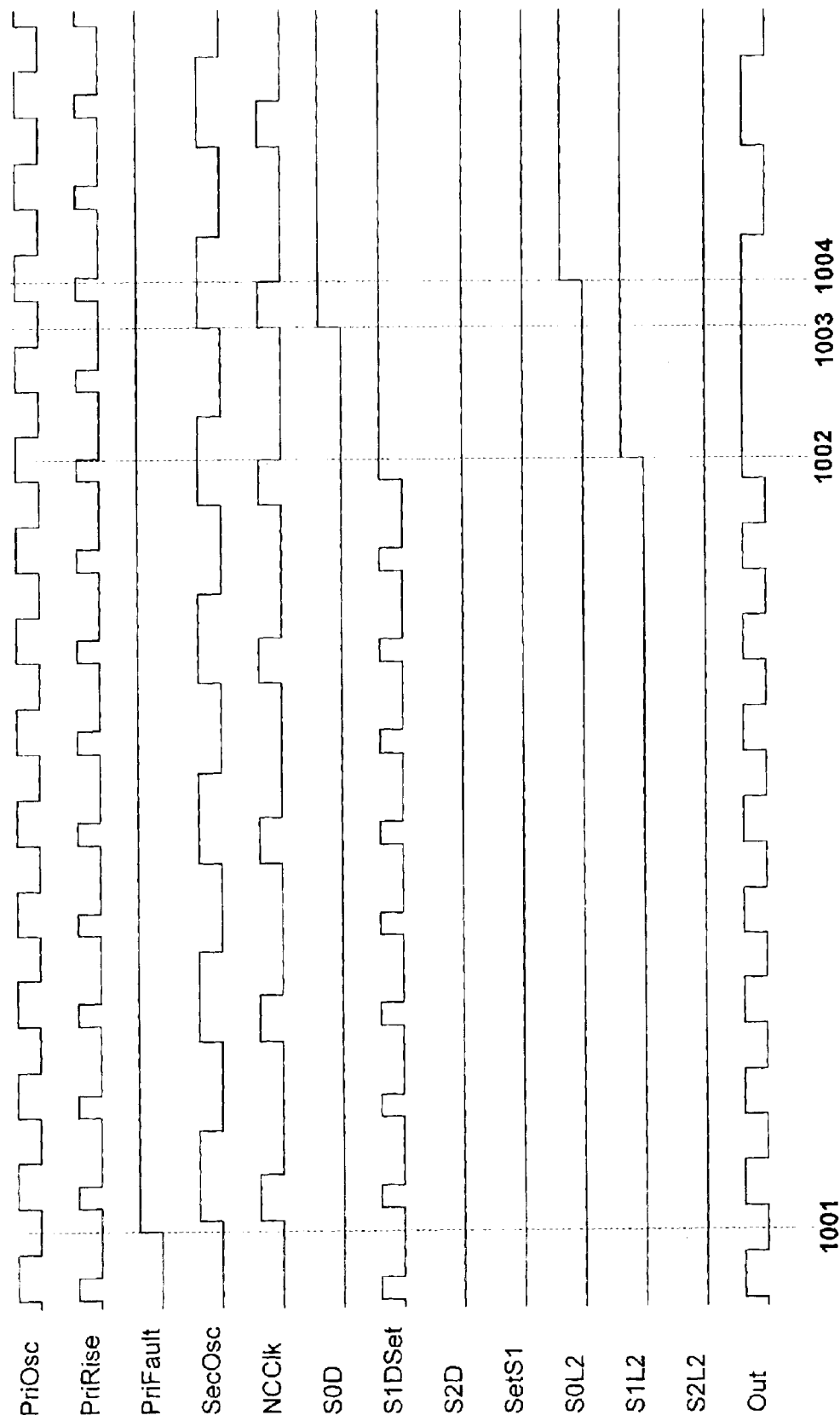
FIGS. 10–13 are timing diagrams illustrating the timing of various signals in the circuit of the preferred embodiment under certain switching conditions.
Figure 11:
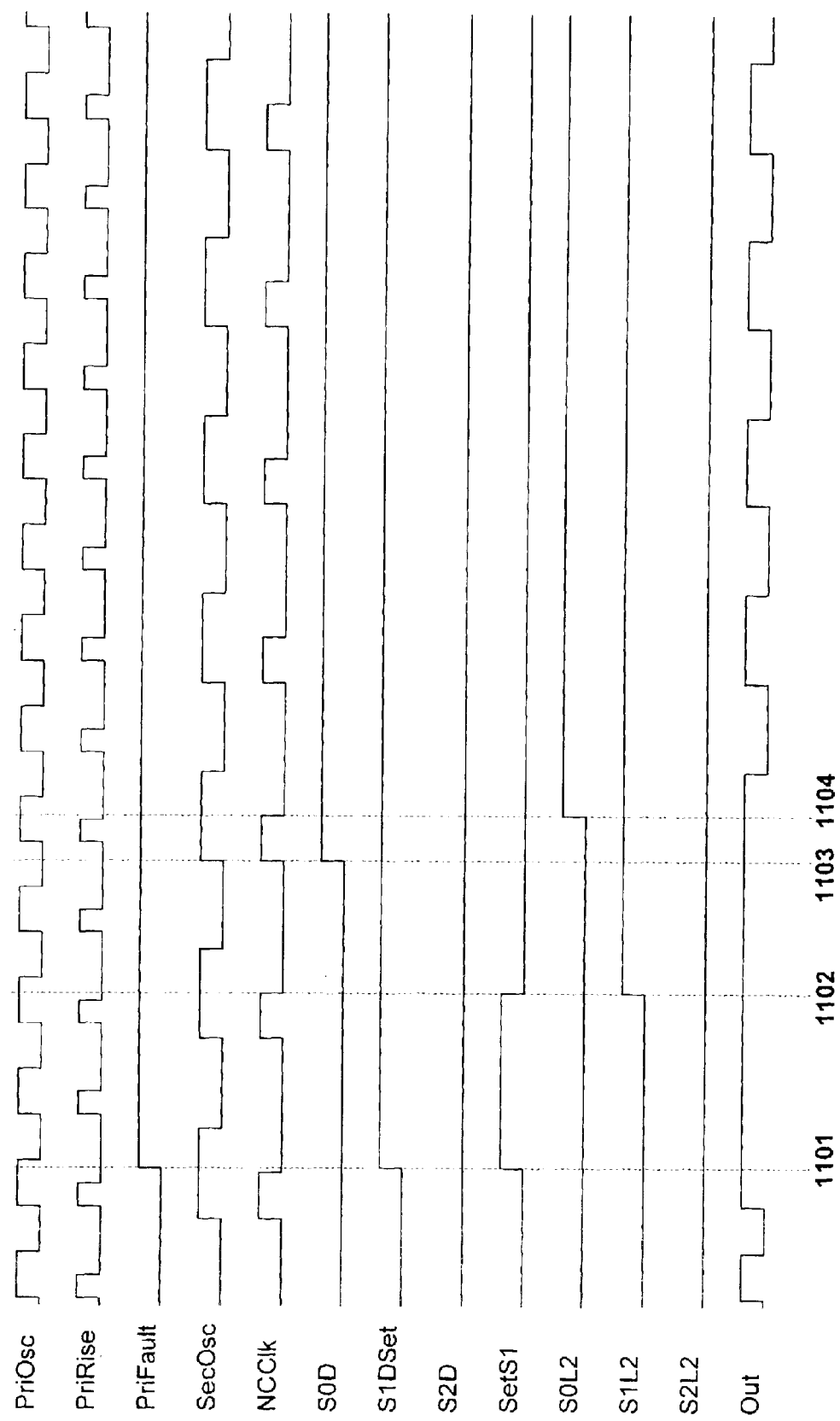
Figure 12:
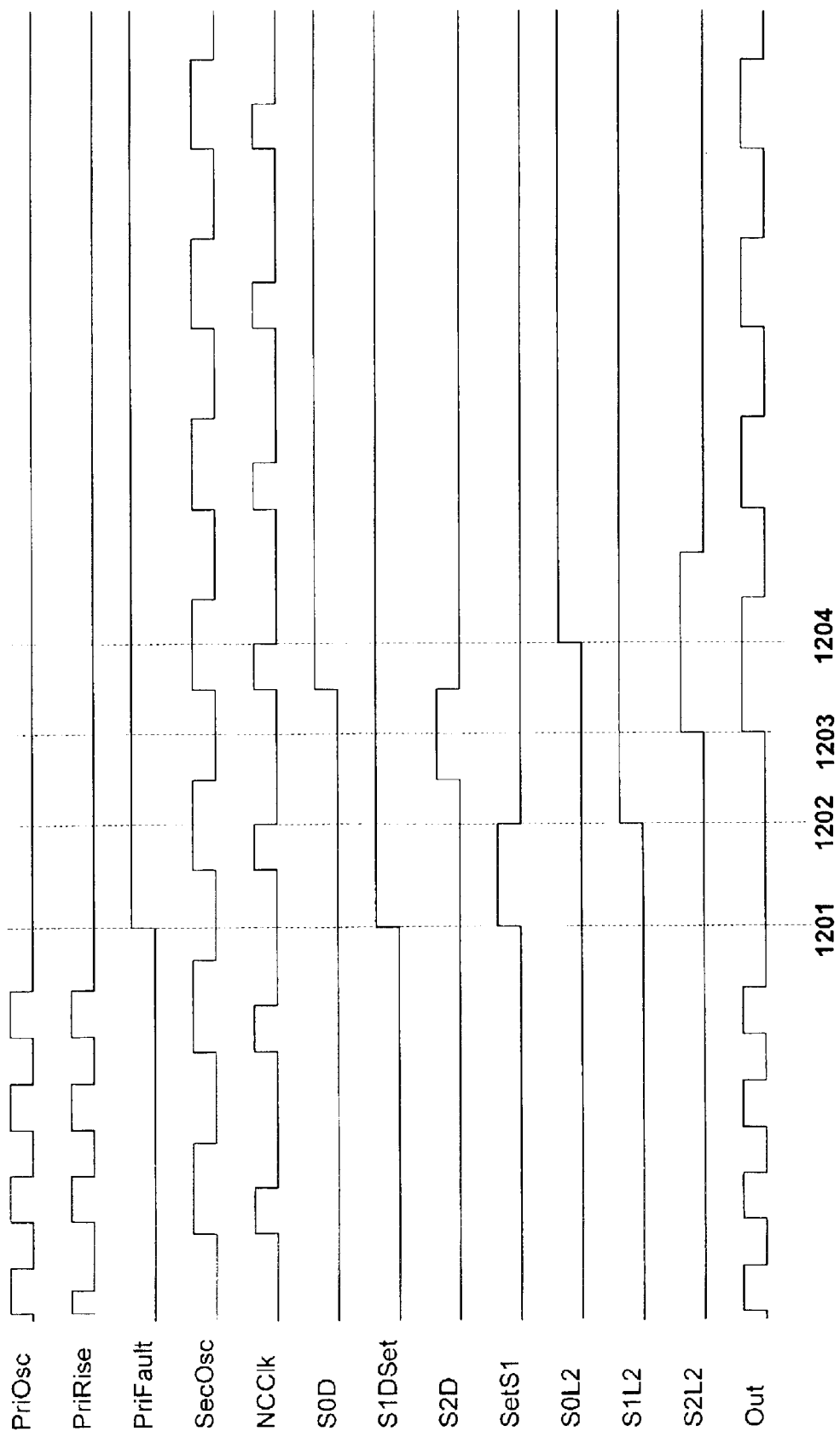

In the examples of FIGS. 10–13, the SecRise signal is assumed to be the same as NCClk, and is not shown separately. Additionally, PriStuck0 is a constant 0 in the examples of FIGS. 10, 11 and 13. In the example of FIG. 12, PriStuck0 is identical to PriFault. For these reasons, PriStuck0 is similarly omitted from the figures.

FIG. 10 is a timing diagram representing a switching operation from the PriOsc to SecOscDiv, where the PriOsc is not stuck at logic 0, and where FastRstEn 636 is set to 0 (disabling the fast set/reset logic). The state machine 304 is initially at a state represented by line 1 of the state table of FIG. 8, in which S0L2, S1L2 and S2L2 are logic 0, as are PriFault and PriStuck0. At time 1001, PriFault rises to signal a fault, represented in the state table as line 2. After PriFault rises, the state machine waits for PriRise 627 to be captured by the S1 latch 602. The rise of PriRise 627 is represented as line 3 of the state table. However, PriRise must be captured by the S1 latch at the falling edge of the NCClk, which is asynchronous to the PriRise signal. If PriRise is not captured by the fall of the NCClk, the state machine effectively transitions back to line 2 of the state table to wait for the next PriRise cycle. Under certain conditions, capture could take many cycles (in fact, capture is not guaranteed to occur within any bounded period of time). As shown in FIG. 10, PriRise occurs shortly after the rise of PriFault at time 1001, but NCClk doesn't fall until after PriRise falls. PriRise is not captured by the S1 latch until time 1002, the seventh PriRise cycle after the rise of PriFault. Capture of PriRise by the S1 latch causes a transition to line 4 of the state table at time 1002. S1L2 and S1Sel rise, causing mux 403 to switch to the bridge state at output. The state machine then waits for SecRise 626 to be captured by the S0 latch. Since SecRise and the NCClk are synchronized to a common source, capture is guaranteed to occur within a limited time. At time 1003, SecRise occurs, causing the S0D input to rise, represented as line 5 of the state table. At time 1004, the NCClk falls and captures SecRise, causing the S0L2 output to rise, represented as line 6 of the state table. The rise of S0L2 causes mux 402 to switch from the bridge state to transmission of SecOscDiv. Note that the bridge state spans times 1002 to 1004. SecOscDiv is now stable at the output.

FIG. 11 is a timing diagram representing a switching operation from the PriOsc to SecOscDiv, where the PriOsc is not stuck at logic 0, and where FastRstEn 636 is set to 1 (enabling the fast set/reset logic). As in the example shown in FIG. 10, the state machine 304 is initially at a state represented by line 1 of the state table of FIG. 8, in which S0L2, S1L2, S2L2, PriFault and PriStuck0 are at logic 0. At time 1101, PriFault rises to signal a fault, represented in the state table as line 2. Since PriOsc is already high, AND gate 907 is immediately triggered, which in turn triggers gates 901, 903, 905 and 906, causing both SetS1 and S1Dset to rise. The rise of SetS1 causes S1Sel to rise, switching mux 403 to the bridge state (which is logic 1, the same as PriOsc). These lines are locked at logic 1 due to the feedback to OR gate 901, and remain at logic 1 even after PriOsc falls. On the next fall of the NCClk at time 1102, the S1DSet is clocked into S1 latch 602, causing S1L2 to rise, represented as line 4 of the state table. The rise of S1L2 shuts off AND gate 903, causing SetS1 to fall, but since S1L2 is now driving OR gate 618, there is no change in the state of mux 403. The state machine then waits for SecRise 626 to be captured by the S0 latch. SecRise occurs at time 1103, causing the S0D input to rise, represented as line 5 of the state table. At time 1104, the NCClk falls and captures SecRise, causing the S0L2 output to rise, represented as line 6 of the state table. The rise of S0L2 causes mux 402 to switch from the bridge state to transmission of SecOscDiv. Note that the bridge state spans times 1002 to 1004. SecOscDiv is now stable. Comparing the timing of FIG. 10 with that of FIG. 11, it will be observed that the fast set/reset logic significantly reduces switch latency, because it is not necessary to wait for PriRise to coincide with a fall of NCClk.

It will be observed that, in the timing diagram of FIG. 12, the state machine holds the output high in the bridge state for a little more than two cycles of SecOscIn. If a pulse of this length is a problem, it would be alternatively possible to shorten the pulse by forcing the transition of the S1 and S0 latches on the same cycle. I.e., at time 1102, SecOscDiv is high, so it is safe to force the transition of the S0 latch, rather than wait until time 1103. This might be accomplished in any of various ways, e.g., by providing additional input to the S0D generation in the combinatorial logic 604 to cause S0D to go high under appropriate conditions.

FIG. 12 is a timing diagram representing a switching operation from the PriOsc to SecOscDiv, where the PriOsc is stuck at logic 0, and where FastRstEn 636 is set to 1. As in the previous examples, the state machine 304 is initially at a state represented by line 7 of the state table of FIG. 8, in which S0L2, S1L2, S2L2, PriFault and PriStuck0 are at logic 0. PriStuck0 is not shown in FIG. 12, but in this example it behaves identically to PriFault. At time 1201, PriFault and PriStuck0 rise to signal a stuck 0 fault, represented by line 8 of the state table. The rise of PriStuck0 causes the bridge state 411 to fall, and since mux 402 is set to select the bridge state line, a logic 0 is output by mux 402. At the same time, the rise of PriStuck0 causes S1D to rise, triggering gates 905, 906, 901 and 903 of fast set/reset logic 305, and causing S1DSet and SetS1 to rise. The rise of SetS1 triggers OR gate 618, causing S1Sel to rise and switching mux 403 to select the output of mux 402. As explained earlier, the bridge state propagation delay should be less than the set/reset logic propagation delay, so that when mux 403 switches, the output of mux 402 is already at logic 0 to match to PriOsc logic level. At the next fall of the NCClk (at time 1202), the S1DSet input is clocked into S1 latch 602, causing S1L2 to rise and shutting off SetS1. The rise of S1L2 causes the S2D input to rise. The state machine is now at the state represented by line 9 of the table. The S2D input is clocked into S2 latch 603 at the next fall of the CCLK (time 1203), i.e., one-half clock cycle after the fall of the NCClk, causing S2L2 to rise, represented by line 10 of the state table. The rise of S2L2 switches bridge state 411 to a logic 1, which is seen as a change in output 314 to a logic 1. The state machine then waits for SecRise to be captured by the NCClk. SecRise causes S0D to rise, which is captured in S0 latch 601 by NCClk at time 1204, causing S0L2 to rise and switch mux 402 to SecOscDiv. The select logic 301 is now transmitting SecOscDiv signal, represented in state table as line 11.

Where the fast set/reset logic is not enabled and a PriOsc stuck 0 fault occurs, the timing is similar, except that SetS1

(and S1Sel) are not immediately triggered. The stuck 0 fault causes S1D to rise and hold (line 8 of the state table), and this is clocked into S1 latch 602 at the next fall of NCClk, causing S2L2 to rise and switch mux 403 (line 9 of the table). Although the output mux 403 would switch at time 1202 instead of time 1201, the output signal is identical.

Figure 13:
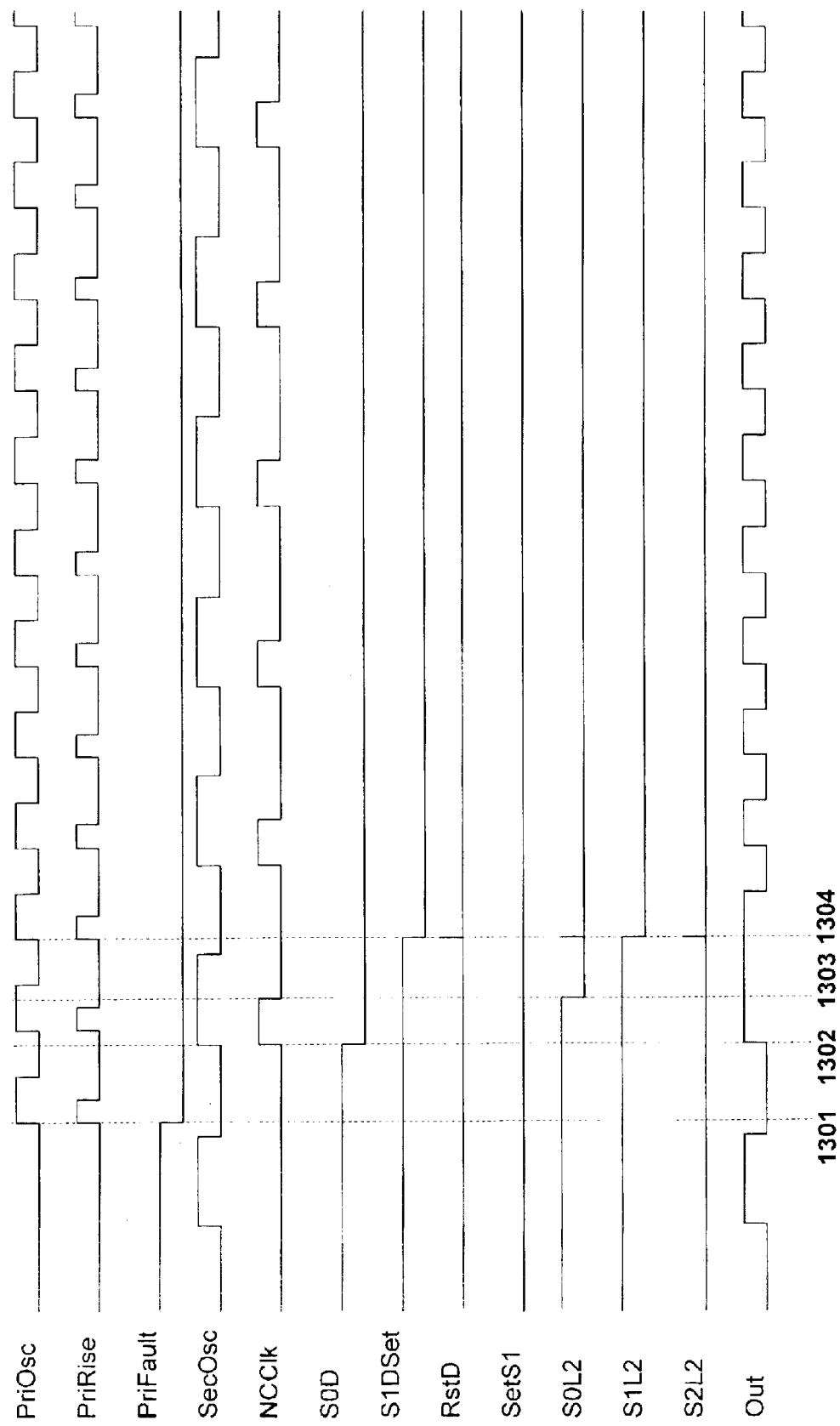

FIG. 13 is a timing diagram representing a switching operation from the SecOscDiv to PriOsc, where FastRstEn 636 is set to 1 (enabling the fast set/reset logic). The state machine 304 is initially at a state represented by line 12 of the state table of FIG. 8, in which S0L2, S1L2, and PriFault are at logic 1, the SecOscDiv signal being output by select logic 301. At time 1301, PriFault falls to signal that PriOsc is now considered available, represented in the state table as line 13. The state machine then waits for SecRise, since the transition should occur on a logic 1. At time 1302, SecOscDiv rises, causing SecRise to rise, and the S0D input to fall, represented in the state table as line 14. The S0D input is clocked into the S0 latch on the next fall of the NCClk at time 1303, represented in the state table as line 15. The capture of the S0D input causes S0L2 to fall, switching mux 402 to the bridge state. With S0L2 low, AND gate 908 of the fast set/reset logic will be triggered by PriOsc high. PriOsc rises at time 1303, causing AND 908 to trigger, and triggering OR gate 902 and AND gate 904, activating RstD signal 621. Activation of RstD causes pulses to be generated on ACLK 628, S(0)ScanIn 629 and TransRst 635, flushing the latches 601–603 to immediately put them in the logic 0 state. Putting the latches in logic 0 causes S1L2 to fall, causing S1Sel to fall, and switching mux 403 to the PriOsc. At the end of the reset pulse, the PriOsc is being transmitted by the select logic, represented as line 17 of the state table.

Where the fast set/reset logic is not enabled and a transition is made from the SecOscDiv to the PriOsc, the timing is similar up to time 1303 (line 15 of the table). From this point, the state machine must wait until PriRise (causing S1D to rise) is captured by the falling edge of the NCClk. As previously explained, the NCClk is asynchronous to PriRise, and capture therefore could take an indefinite number of cycles. Once captured, S1L2 rises to switch mux 403 to the PriOsc signal.

Figure 14:
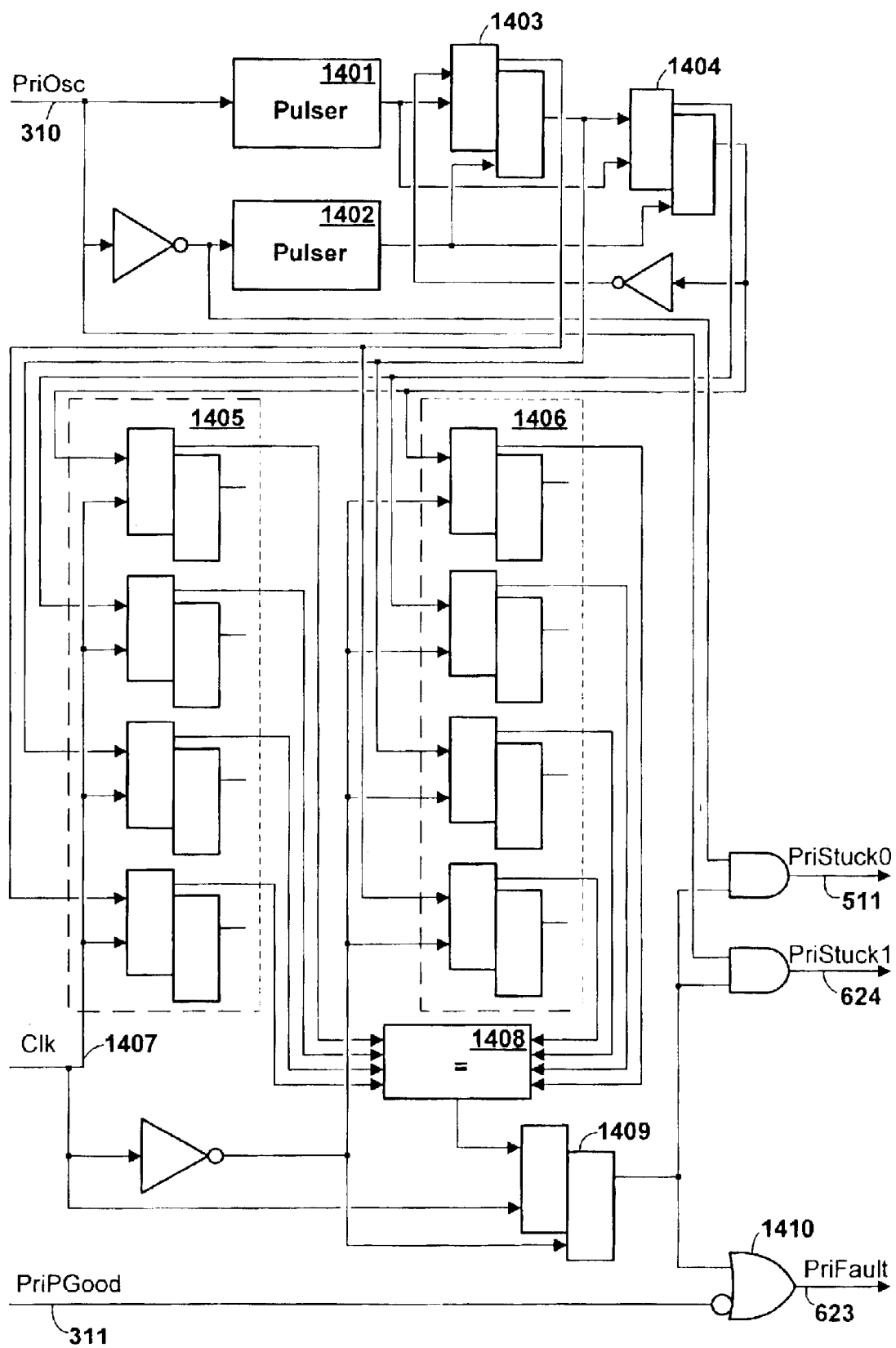
FIG. 14 is a circuit diagram showing in greater detail an implementation of a detector circuit for detecting certain oscillator faults, according to the preferred embodiment.

FIG. 14 is a circuit diagram showing in greater detail an implementation of detector circuit 305, according to the preferred embodiment. Detector circuit detects certain faults in the primary oscillator signal. It is assumed that the secondary oscillator (typically a local oscillator) is available. Detector circuit 305 is designed to automatically detect stuck faults (either logic 0 or logic 1), without requiring their detection externally, but will not necessarily detect other types of oscillator faults (such as out-of-spec frequency, noise, etc.). It is felt that other types of oscillator faults are less common and much more difficult to detect, so that a relatively simple detection circuit for stuck faults only yields greatest cost benefit. In addition, detector circuit 305 uses an external status signal (PriPGood) 311 to determine a fault. The external status signal can be used to detect these other types of oscillator fault, assuming appropriate detection circuitry exists externally. But particularly, the PriPGood external status signal 311 may be useful for signaling an impending potential fault condition, before it occurs. For example, when performing certain concurrent maintenance operations which are likely to disrupt the primary oscillator signal, PriPGood 311 may be used to signal to all devices using the primary oscillator that they should temporarily switch to a back-up oscillator.

Referring to FIG. 14, PriOsc 310 and its complement are input to a matched pair of pulser circuits 1401, 1402, each of which of which produces a short pulse, synchronized with the leading edge of the pulser circuit input. A pulser circuit may be the same as circuit 614 used to generate PriRise signal 627 (shown in FIG. 6A), and may have a short fixed delay or a tunable delay. The outputs of pulser circuits 1401, 1402 serve as clock signals for 2-stage latches 1403, 1404, the inverted output of the second stage of latch 1404 being fed back as data input to latch 1403. Thus, a changing pattern of logic 1's and 0's is shifted through latches 1403, 1404 with every half-cycle of PriOsc 310.

The outputs of each latch stage of latches 1403, 1404 (four outputs in all) are input to separate banks of latches 1405, 1406, each bank being clocked by a different phase of clock 1407. Latch banks 1405, 1406 are shown as 2-stage latches for consistency, although only a single stage is used; they could alternatively be single-stage latches. The outputs of the two banks of latches are compared by comparator 1408, and a logic 1 input to latch 1409 is generated if all the contents of the banks of latches are identical.

In operation, the contents of latches 1403, 1404 are constantly cycling, and therefore latch banks 1405, 1406 should always see a different phase of the cycle, so that they should never be identical. If, however, PriOsc 310 becomes stuck, the contents of latches 1403, 1404 will be frozen, and the latch banks 1405, 1406 will compare. Clock 1407 must be independent of PriOsc 310, and is preferably derived from SecOscIn oscillator signal 312. Clock 1407 may be the same as SecOscIn, or it may be the result of an optional frequency divider (not shown). However, in the detector circuit shown in FIG. 14, clock 1407 must have a frequency less than that of PriOsc 310, or the two banks of latches 1405, 1406 might capture the same phase of PriOsc 310, and erroneously signal a fault.

The output of latch 1409 signals a detected stuck fault condition. This is logically ORed with PriPGood signal 311 in OR gate 1410 to produce PriFault signal 623. The output of latch 1409 is also input to AND gate 1411, along with the inverted PriOsc signal, to produce PriStuck0 signal 511, and separately input to AND gate 1412, along with the PriOsc signal, to produce PriStuck 1 signal 624.

It will be appreciated that the circuit of FIG. 14 is simply one possible embodiment of a fault detector circuit, and that many alternative fault detector circuits might be employed, or that an oscillator switching circuit in accordance with the present invention might contain no detector circuit at all, and rely entirely on an external signal to indicate that a fault condition exists of the oscillator output should be switched. Furthermore, while in the preferred embodiment there is a detector circuit only for the primary oscillator, it would alternatively be possible to have detector circuitry for detecting faults in the secondary oscillator, or in both oscillator inputs.

Optional configuration and status interface logic 308 may be used to configure delay or other values in switching circuit 300, and to record error and status conditions. Preferably, configuration and status interface logic 308 comprises multiple registers holding configuration and status data, and an interface for reading and/or writing values to the registers. The interface may, e.g., be a serial clock and data line set for sequentially inputting or outputting the contents of the registers. Since it is expected that configuration registers be changed infrequently, a high speed interface is unnecessary. The registers preferably hold a fast set/reset enable bit, which is output to fast set/reset logic 305 on FastRstEn line 636. The configuration registers preferably also hold delay parameter values for tunable delays 613, 615 and 617. The status registers may hold the status detected by detector 306 (such as the state of PriFault line 623 or PriStuck0 line 511), the state of state machine 304 (as determined by latches 601–603), or other status information. Config/status logic 308 could contain additional configuration parameters for providing greater flexibility to a switching circuit. For example, optional frequency divider 307 could be configurable to one of a number of frequency settings, the configuration setting being determined by a value in configuration logic 308.

An oscillator switching circuit as described herein may or may not be used in conjunction with a phase locked loop (PLL) circuit for generating a clock. In one application, the output 314 of the switching circuit could be coupled to the reference input of a PLL. Data in configuration/status 308 could be provided to the PLL to indicate the target clock frequency. In a second application, the output of a PLL could be used to provide one or more input clock signals to the switching circuit. In a third application, an oscillator switching circuit might stand independently, without a PLL. Preferably, a PLL, where present, would be implemented on the same integrated circuit chip as the oscillator switching circuit.

Although the circuit of the preferred embodiment has the capability to detect and respond to certain fault conditions as described herein, it will be understood that any physical device is limited to an environment, and the circuit described herein is not necessary designed to respond to all possible oscillator conditions. In particular, it is assumed that rapid changes in the fault state will not occur, so that the state machine will have sufficient time to respond to any change and stabilize at either the primary oscillator or secondary oscillator output, before another change occurs. If, for example, a fault is signaled on PriFault line, and the PriFault line falls before the transition to the secondary oscillator is complete, the switching circuit may output chopped pulses before stabilizing. The designers of the system are responsible for assuring that appropriate environmental conditions are met.

Although an oscillator switching circuit in accordance with the preferred embodiment is capable of switching in either direction (either from the primary to secondary, or vice-versa) using similar functional operation, such a circuit may alternatively be designed solely for one-way switching. For example, such a circuit may be used only at power-on or reset type events, to switch from a local temporary oscillator source to a remote global oscillator.

Although transmission switch control logic has been described herein in detail, it will be understood that an oscillator switching circuit in accordance with the present invention may be implemented using many variations of logic circuitry. In addition to those variation described above, several variations are mentioned herein by way of example, and not by way of limitation. A bridge state need not be implemented in a separate bridge state switch, but could be combined with selection logic and/or transmission control logic; e.g., a separate high and low bridge state input could be provided to a mux, which are selected under the control of transmission control logic. Fast set/reset logic 305 could be combined with combinatorial input logic 604 in various alternative ways to provide inputs to state latches. Other or additional state latches could be provided to facilitate transitions to or through other states. Latches of different types could be used. Different forms of input could be present to signal fault conditions.

Although transmission control logic in accordance with certain aspects of the present invention has been described herein as a state machine implemented in multiple two-state latches which collectively record a state, it will be understood that an oscillator switching circuit in accordance with some aspects of the present invention need not be implemented as a state machine comprising clocked latches, and might comprise other form of digital logic which function as described and claimed herein.

Although a specific embodiment of the invention has been disclosed along with certain alternatives, it will be recognized by those skilled in the art that additional variations in form and detail may be made within the scope of the following claims:

What is claimed is:

1. An oscillator switching circuit, comprising:

selection logic for selecting one of a first oscillator input, a second oscillator input and a bridge input for output from said selection logic, said first and second oscillator inputs being asynchronous;

transmission control logic coupled to said selection logic, said transmission control logic controlling a change of selection logic output from said first oscillator to said second oscillator;

wherein said change of selection logic output is performed by a first transition from selection of said first oscillator for output from said selection logic to selection of said bridge input for output from said selection logic, said first transition being made at a time during which said bridge input is at the same logic level as said first oscillator, said first transition being performed independently of the logic level of said second oscillator; and wherein said change of selection logic output is further performed by a second transition from selection of said bridge input for output from said selection logic to selection of said second oscillator for output from said selection logic, said second transition being made at a time during which said bridge input is at the same logic level as said second oscillator, said second transition being performed independently of the logic level of said first oscillator.

2. The oscillator switching circuit of claim 1, wherein said transmission control logic controls a change of selection logic output from said second oscillator to said first oscillator;

wherein said change of selection logic output from said second oscillator to said first oscillator is performed by a third transition from selection of said second oscillator for output from said selection logic to selection of said bridge input for output from said selection logic, said third transition being made at a time during which said bridge input is at the same logic level as said second oscillator, said third transition being performed independently of the logic level of said first oscillator; and wherein said change of selection logic output from said second oscillator to said first oscillator is further performed by a fourth transition from selection of said bridge input for output from said selection logic to selection of said first oscillator for output from said selection logic, said fourth transition being made at a time during which said bridge input is at the same logic level as said first oscillator, said fourth transition being performed independently of the logic level of said second oscillator.

3. The oscillator switching circuit of claim 1, wherein said transmission control logic includes bridge input switch logic which selectively sets the logic level of said bridge input.

4. The oscillator switching circuit of claim 1, further comprising:
a fault detection circuit for detecting a fault of said first oscillator input, said fault detection circuit providing at least one signal indicative of a fault to said transmission control logic.

5. The oscillator switching circuit of claim 1, wherein said oscillator switching circuit switches oscillators in response to at least one external oscillator fault signal.

6. The oscillator switching circuit of claim 1, wherein said selection logic comprises first, second and third two-input multiplexer circuits, said first and second multiplexers receiving respective inputs and each producing a single respective output, said third multiplexer receiving said outputs of said first and second multiplexers and producing a single output, said first and second multiplexers being balanced.

7. The oscillator switching circuit of claim 1, wherein said transmission control logic comprises:
a state machine containing a plurality of memory elements for storing a state of said oscillator switching circuit, said state being one of a plurality of states, said plurality of states comprising a state selecting said first oscillator for output, a state selecting said second oscillator for output, and at least one bridge state selecting said bridge input for output, said memory elements providing control input to said selection logic; and
memory element input logic for determining inputs to said plurality of memory elements.

8. The oscillator switching circuit of claim 7, wherein said plurality of memory elements of said state machine comprise a plurality of two-stage latches, each respective stage of a two-stage latch of said plurality of two-stage latches receiving input at a different phase of a clock signal, each clock signal for said plurality of two-stage latches being derived from a common source.

9. The oscillator switching circuit of claim 8, wherein one of said first oscillator input and second oscillator input is derived from said common source.

10. The oscillator switching circuit of claim 9, further comprising a frequency divider circuit, said frequency divider circuit receiving said common source as input and producing one of said first oscillator input and said second oscillator input as output.

11. The oscillator switching circuit of claim 7, wherein said plurality of states comprises at least two bridge states, including a first bridge state in which said bridge input is held at a first constant logic level, and a second bridge state in which said bridge input is held at a second constant logic level, said second logic level being different from said first logic level.

12. The oscillator switching circuit of claim 7, wherein said transmission control logic further comprises fast transition logic, said fast transition logic temporarily by-passing outputs of said memory elements to directly provide at least one input to said selection logic.

13. The oscillator switching circuit of claim 12, wherein said fast transition logic is selectively enableable.

14. An oscillator switching circuit, comprising:
a first oscillator input and a second oscillator input;
an output;
oscillator switching logic coupled to said first and second oscillator inputs and said output, said oscillator switching logic selectively transmitting said first oscillator input and said second oscillator input to said output and controlling a change of output from said first oscillator to said second oscillator input where said first and second oscillators are asynchronous, said oscillator switching logic controlling said change of output from said first oscillator to said second oscillator where said first and second oscillators are asynchronous by performing a first transition followed by a second transition;
said first transition being a transition from transmitting said first oscillator input to said output to transmitting an internally generated bridge level to said output, said bridge level being the same as a logic level of said first oscillator input at the time of said first transition, said first transition being performed asynchronously to said second oscillator input; and
said second transition being a transition from transmitting said bridge level to said output to transmitting said second oscillator input to said output, said bridge level being the same as the logic level of said second oscillator input at the time of said second transition, said second transition being performed asynchronously to said first oscillator input.

15. The oscillator switching circuit of claim 14,
wherein said oscillator switching logic further controls a change of output from said second oscillator to said first oscillator, said oscillator switching logic controlling a change of output from said second oscillator to said first oscillator by performing a third transition followed by a fourth transition;
said third transition being a transition from transmitting said second oscillator input to said output to transmitting said internally generated bridge level to said output, said bridge level being the same as the logic level of said second oscillator input at the time of said third transition, said third transition being performed asynchronously to said first oscillator input; and
said fourth transition being a transition from transmitting said bridge level to said output to transmitting said first oscillator input to said output, said bridge level being the same as the logic level of said first oscillator input at the time of said fourth transition, said fourth transition being performed asynchronously to said second oscillator input.

16. The oscillator switching circuit of claim 14, wherein said oscillator switch logic selectively sets the logic level of said internally generated bridge level.

17. The oscillator switching circuit of claim 14, further comprising:
a fault detection circuit for detecting a fault of said first oscillator input, said fault detection circuit providing at least one signal indicative of a fault to said oscillator switch logic.

18. The oscillator switching circuit of claim 14, wherein said oscillator switch logic comprises:
a state machine containing a plurality of memory elements for storing a state of said oscillator switching circuit, said state being one of a plurality of states, said plurality of states comprising a state selecting said first oscillator for output, a state selecting said second oscillator for output, and at least one bridge state selecting said bridge input for output, said memory elements providing control input to said selection logic; and
memory element input logic for determining inputs to said plurality of memory elements.

19. An oscillator switching circuit, comprising:
a first oscillator input and a second oscillator input;
an output;
switch control logic selectively controlling transmission of said first oscillator input and second oscillator input to said output and controlling a transition of output from said first oscillator input to said second oscillator input where said first and second oscillators are asynchronous, said switch control logic comprising a state machine containing a plurality of memory elements for storing a state of said oscillator switching circuit, said state being one of a plurality of states, said plurality of states comprising a state selecting said first oscillator for output, a state selecting said second oscillator for output, and at least one bridge state selecting a bridge logic level for output, said memory elements providing control input to said selection logic, and memory element input logic for determining inputs to said plurality of memory elements;
wherein said state machine traverses said state selecting said first oscillator for output, at least one said bridge state, and said state selecting said second oscillator for output, during said transition of output from said first oscillator input to said second oscillator input.

20. The oscillator switching circuit of claim 19,
wherein said switch control logic further controls a transition of output from said second oscillator to said first oscillator
wherein said state machine traverses said state selecting said second oscillator for output, at least one said bridge state, and said state selecting said first oscillator for output, during said transition of output from said second oscillator input to said first oscillator input.

21. The oscillator switching circuit of claim 19, wherein said plurality of states comprises at least two bridge states, including a first bridge state in which said bridge input is held at a first constant logic level, and a second bridge state in which said bridge input is held at a second constant logic level, said second logic level being different from said first logic level.

22. The oscillator switching circuit of claim 19,
wherein said switch control logic performs a transition from transmitting said first oscillator input to said output to transmitting said bridge level to said output asynchronously to said second oscillator input; and
wherein said switch control logic performs a transition from transmitting said bridge level to said output to transmitting said second oscillator input to said output asynchronously to said first oscillator input.

23. The oscillator switching circuit of claim 19, further comprising:
a fault detection circuit for detecting a fault of said first oscillator input, said fault detection circuit providing at least one signal indicative of a fault to said oscillator switch logic.

24. The oscillator switching circuit of claim 19, wherein said plurality of memory elements of said state machine comprise a plurality of two-stage latches, each respective stage of a two-stage latch of said plurality of two-stage latches receiving input at a different phase of a clock signal, each clock signal for said plurality of two-stage latches being derived from a common source.

25. The oscillator switching circuit of claim 24, wherein one of said first oscillator input and second oscillator input is derived from said common source.

26. The oscillator switching circuit of claim 25, further comprising a frequency divider circuit, said frequency divider circuit receiving said common source as input and producing one of said first oscillator input and said second oscillator input as output.

27. The oscillator switching circuit of claim 19, wherein said switch control logic further comprises fast transition logic, said fast transition logic temporarily by-passing outputs of said memory elements to directly provide at least one input to said selection logic.

28. The oscillator switching circuit of claim 27, wherein said fast transition logic is selectively enableable.

29. An integrated circuit for a digital data processing device, comprising:
a plurality of logic circuits for performing at least one function of said digital data processing device; and
oscillator switching circuit for providing an oscillator signal to at least some of said plurality of logic circuits, said oscillator switching circuit comprising:
a first oscillator input and a second oscillator input;
an output;
oscillator switching logic coupled to said first and second oscillator inputs and said output, said oscillator switching logic selectively transmitting said first oscillator input and said second oscillator input to said output and controlling a change of output from said first oscillator to said second oscillator input where said first and second oscillators are asynchronous, said oscillator switching logic controlling said change of output from said first oscillator to said second oscillator where said first and second oscillators are asynchronous by performing a first transition followed by a second transition;
said first transition being a transition from transmitting said first oscillator input to said output to transmitting an internally generated bridge level to said output, said bridge level being the same as a logic level of said first oscillator input at the time of said first transition, said first transition being performed asynchronously to said second oscillator input; and
said second transition being a transition from transmitting said bridge level to said output to transmitting said second oscillator input to said output, said bridge level being the same as the logic level of said second oscillator input at the time of said second transition, said second transition being performed asynchronously to said first oscillator input.

30. The integrated circuit of claim 29,
wherein said oscillator switching logic further controls a change of output from said second oscillator to said first oscillator, said oscillator switching logic controlling a change of output from said second oscillator to said first oscillator by performing a third transition followed by a fourth transition;
said third transition being a transition from transmitting said second oscillator input to said output to transmitting said internally generated bridge level to said output, said bridge level being the same as the logic level of said second oscillator input at the time of said third transition, said third transition being performed asynchronously to said first oscillator input; and
said fourth transition being a transition from transmitting said bridge level to said output to transmitting said first oscillator input to said output, said bridge level being the same as the logic level of said first oscillator input at the time of said fourth transition, said fourth transition being performed asynchronously to said second oscillator input.

31. The integrated circuit of claim 29, wherein said oscillator switch logic selectively sets the logic level of said internally generated bridge level.

32. The integrated circuit of claim 29, further comprising:
- a fault detection circuit for detecting a fault of said first oscillator input, said fault detection circuit providing at least one signal indicative of a fault to said oscillator switch logic.

33. The integrated circuit of claim 29, wherein said oscillator switch logic comprises:
- a state machine containing a plurality of memory elements for storing a state of said oscillator switching circuit, said state being one of a plurality of states, said plurality of states comprising a state selecting said first oscillator for output, a state selecting said second oscillator for output, and at least one bridge state selecting said bridge input for output, said memory elements providing control input to said selection logic; and
- memory element input logic for determining inputs to said plurality of memory elements.

* * * * *